US012663576B2

(12) United States Patent
Boardman et al.

(10) Patent No.: US 12,663,576 B2
(45) Date of Patent: Jun. 23, 2026

(54) WAVEGUIDE MANUFACTURE

(71) Applicant: Envisics Ltd, Milton Keynes (GB)

(72) Inventors: Edward Boardman, Milton Keynes (GB); Timothy Smeeton, Milton Keynes (GB); Ruisheng Lin, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 199 days.

(21) Appl. No.: 18/335,812

(22) Filed: Jun. 15, 2023

(65) Prior Publication Data

US 2024/0019625 A1 Jan. 18, 2024

(51) Int. Cl.
| | |
|---|---|
| *F21V 8/00* | (2006.01) |
| *G02B 5/32* | (2006.01) |
| *G02B 27/00* | (2006.01) |
| *G02B 27/01* | (2006.01) |
| *G03H 1/22* | (2006.01) |

(52) U.S. Cl.
CPC ............ *G02B 6/0065* (2013.01); *G02B 5/32* (2013.01); *G02B 6/0018* (2013.01); *G02B 6/0026* (2013.01); *G02B 6/0055* (2013.01); *G02B 27/0081* (2013.01); *G02B 27/0103* (2013.01); *G03H 1/2294* (2013.01); *G02B 2027/0107* (2013.01)

(58) Field of Classification Search
CPC .. G02B 6/0065; G02B 6/0018; G02B 6/0026; G02B 6/0055; G02B 5/32; G02B 27/0081; G02B 27/0103; G03H 1/2294
See application file for complete search history.

(56) References Cited

U.S. PATENT DOCUMENTS

| | | | | |
|---|---|---|---|---|
| 11,567,317 | B2 * | 1/2023 | Christmas | ................ G03H 1/02 |
| 12,135,424 | B2 * | 11/2024 | Christmas | .......... G02B 27/0081 |
| 2001/0041040 | A1 | 11/2001 | McCallion | |
| 2018/0252869 | A1 * | 9/2018 | Ayres | ................. G02B 27/0081 |
| 2020/0116997 | A1 | 4/2020 | Lee | |
| 2021/0157265 | A1 | 5/2021 | Komanduri | |
| 2021/0165212 | A1 | 6/2021 | Christmas | |
| 2021/0294101 | A1 | 9/2021 | Cole | |
| 2022/0214494 | A1 | 7/2022 | Levola | |
| 2022/0390665 | A1 * | 12/2022 | Grabarnik | ........... G02B 6/0065 |
| 2023/0152580 | A1 | 5/2023 | Christmas | |

FOREIGN PATENT DOCUMENTS

GB 2594133 A 10/2021

OTHER PUBLICATIONS

Combined Search and Examination Report in United Kingdom, Patent Application No. GB2210428.5, dated Jan. 23, 2023.

* cited by examiner

*Primary Examiner* — Tina Wong
(74) *Attorney, Agent, or Firm* — McDonnell Boehnen Hulbert & Berghoff LLP

(57) ABSTRACT

A method is provided of manufacturing a waveguide comprising an input port, an output port, a transparent medium having a first refractive index ($n_1$), a first pair of opposing surfaces and a second pair of opposing surfaces. The method comprises polishing at least one surface of the second pair of opposing surfaces to achieve a separation therebetween, bonding a protective layer to at least one polished surface of the second pair of opposing surfaces; and polishing at least one surface of the first pair of opposing surfaces to achieve a separation therebetween.

20 Claims, 15 Drawing Sheets

300

510

506

508

502

500

504

540

520

526b

524b

524a

526a

522

530

1116

1118

1224

1226

WAVEGUIDE MANUFACTURE

CROSS-REFERENCE TO RELATED APPLICATIONS

This application claims the benefit of priority of United Kingdom Patent Application No. 2210428.5 filed Jul. 15, 2022, which is hereby incorporated herein by reference in its entirety.

FIELD

The present disclosure relates to a waveguide and a method of manufacturing a waveguide. More specifically, the present disclosure relates to a waveguide, and a method of manufacturing a waveguide, which is suitable for receiving and guiding a diffracted or diffractive light field. Some embodiments relate to a holographic projector, picture generating unit or head-up display that includes a waveguide.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a waveguide, or pupil expander, and to a method of manufacturing such a waveguide (or pupil expander), wherein the waveguide (or pupil expander) is configured to provide pupil expansion in at least one dimension. As the skilled reader will appreciate, pupil expansion comprises, in broad terms, outputting multiple replicas (or, copies) of an input light ray (or, of an input bundle of light rays that form a light field) in order to increase the size of the eye-box—i.e., to increase the volume of space within which the viewer can receive the light, for a given angular field of view, in order to see (or perceive) an object or image corresponding to the input light.

The input light may be holographic light. That is, it may be light that has been modulated (I.e., encoded) by a hologram. It may be light that has been modulated by a hologram but has not yet been reconstructed to form an image (that is, the reconstruction may take place in/at the eye(s) of the viewer), or it may be light of a holographic reconstruction that has been formed either in free space or on a receiving surface, upstream of the viewer.

The input light may be diffractive or diverging light. In other words, the input light may be non-collimated light, which expands in at least one direction, orthogonal to the predominant direction of travel of the light, between the light source and the viewer. The waveguide may be configured to accommodate the diffractive or divergent light and to prevent or to at least substantially reduce the risk of light being lost, as a result of its divergence/diffraction, through a surface other than an intended exit (or output) surface of the waveguide.

The waveguide may be a rod-type waveguide, comprising a solid block (or other formation) of material, such as glass, which is suitable for guiding light therethrough, via reflection and reflection-transmission between two opposing surfaces of the rod. The waveguide may be relatively long in a direction in which waveguiding is to be provided and relatively short in each of the other two, orthogonal directions.

The waveguide may be substantially rod-shaped, or cuboidal, in shape. However other shapes are contemplated.

The waveguide may be provided in conjunction with any suitable light source and/or any other suitable source of the light of an image, such as a display device, such as a spatial light modulator (SLM). The waveguide may be provided as part of any suitable optical system. It may be provided within or in conjunction with a projector such as a holographic projector and/or within or in conjunction with a head-up display.

The waveguide may be protected by one or more protective layers, either side of a core (I.e., of a centre) that provides waveguiding functionality. The protective layers may be directly attached to the core waveguide or there may be one or more interim layers, that may comprise adhesive and/or an optical coating.

The waveguide and its protective layers may be compiled and/or treated, before use, in a manner that ensures the edges of the waveguide—or, at least those edges that are involved in waveguiding and/or reflection—are sharp and well defined, so as to avoid introducing errors or defects into an image, the light of which is to be guided through the waveguide.

The protective layers may be configured to protect the waveguide, and to ensure it has fewer or no defects that might affect image quality, as compared to conventional waveguides, whilst still enabling the waveguide to output replicas and without changing or reducing the quality or content of the light of those replicas, or the angular field of view.

According to a first aspect, a method is provided of manufacturing a waveguide comprising an input port, an output port, a transparent medium having a first refractive index ($n_1$), a first pair of opposing surfaces and a second pair of opposing surfaces. The method comprises polishing at least one surface of the second pair of opposing surfaces to achieve a separation therebetween, bonding a protective layer to the at least one polished surface of the second pair of opposing surfaces, and polishing at least one surface of the first pair of opposing surfaces to achieve a separation therebetween.

The separation achieved between the surfaces of the first pair of opposing surfaces may be a first separation. The separation achieved between the surfaces of the second pair of opposing surfaces may be a second separation, which may be different to the first separation.

The steps of: 1. polishing at least one surface of the second pair of opposing surfaces to achieve a separation therebetween, 2. bonding a protective layer to the at least one polished surface of the second pair of opposing surfaces, and 3. polishing at least one surface of the first pair of opposing surfaces to achieve a separation therebetween may be carried out sequentially (I.e., one after the respective other in the order 1., then 2., then 3.).

The transparent medium may be configured (either inherently or as a result of method steps, carried out before use) to function as a waveguide. The first pair of opposing surfaces of the transparent medium may comprise one transmissive-reflective surface and one reflective surface. The first pair of opposing surfaces may be arranged to guide a light field through the transparent medium from the input port to the output port by reflection therebetween, wherein a first surface of the first pair of parallel surfaces is partially transmissive-reflective such that the light field is divided at each reflection and a plurality of replicas of the light field are transmitted through a region of the first surface that forms the output port.

The input port may be provided in or on the reflective surface and the output port may be provided in or on the transmissive-reflective surface, or vice versa. There may be more than one output port. For example, a plurality of output ports may be provided, spaced apart from one another along an elongate direction of one of the surfaces of the first pair of opposing surfaces.

The step of polishing at least one surface of the second pair of opposing surfaces may be described as polishing the transparent medium in a first direction, of three possible mutually orthogonal directions. For example, it may be described as polishing the transparent medium in a "thickness" direction, to reduce its thickness in that first direction.

The second pair of opposing surfaces of the transparent medium may be configured, inherently and/or as a result of method steps, carried out before use, to provide internal reflection, such as total internal reflection, of light within the waveguide. They may be configured not to allow light from within the waveguide (or to allow only a small amount of light within the waveguide) to be transmitted therethrough. The second pair of opposing surfaces may be referred to as the reflection surfaces, or the TI R (total internal reflection) surfaces.

The step of polishing at least one surface of the second pair of opposing surfaces to achieve a separation therebetween may comprise rubbing or abrading the surface. It may result in a loss of material from the polished surface and therefore, in effect, a change in the separation between the first and second surfaces of the second pair—i.e., to a change in thickness of the transparent medium in one dimension. The at least one surface of the second pair of opposing surfaces may be polished until a desired separation between it and the opposite surface of the pair is achieved, I.e., until a desired thickness of the transparent medium is achieved. The at least one surface of the second pair of opposing surfaces may be polished in a controlled manner, so that it loses material from the surface substantially evenly across its surface area, such that the separation between the first and second surfaces of the second pair is largely even and consistent, across much of the width of the transparent medium. Each of the surfaces of the second pair of opposing surfaces may be substantially planar, and preferably they are substantially parallel to one another—that is, a substantial part of the first surface of the second pair of opposing surfaces is preferably parallel to a substantial part of the second surface of the second pair of opposing surfaces of the transparent medium, at least after the at least one surface of the second pair has been polished. The separation between the two surfaces may be measured in a direction substantially orthogonal to a plane defined by (a large part of) the at least one surface of the second pair.

The step of polishing at least one surface of the second pair of opposing surfaces may result in the edges of the polished surface (of the second pair of opposing surfaces) being imperfect, and/or lacking in sharpness. It may also result in at least one of the corners of the polished surface (of the second pair of opposing surfaces) being rounded or chamfered, in at least one plane. The protective layers may be used to address these imperfections and rounding, as detailed below.

The step of bonding a protective layer to the at least one polished surface of the second pair of opposing surfaces may comprise bonding two protective layers, each one to a respective one of the surfaces of the second pair. The bonding may be direct or indirect. The protective layer(s) may be substantially parallel to a planar part of the surface(s) of the second pair, to which it/they is/are bonded.

When two protective layers are bonded to the polished transparent medium, the transparent medium may be said to form a central or "core" waveguide, sandwiched between the two protective layers. It may be said that the whole structure comprises a "cladded" or protected waveguide.

The step of polishing at least one surface of the first pair of opposing surfaces may be described as polishing the transparent medium in a second, different direction, of the three possible mutually orthogonal directions. For example, it may be described as polishing the transparent medium in a "width" direction, to reduce its width in that second direction.

The first pair of opposing surfaces may be the surfaces that provide (either inherently, or as a result of methods steps, carried out before use) waveguiding within the transparent medium, and pupil expansion via the output of multiple replicas of an input light field. A light field may be repeatedly bounced between the two surfaces of the first pair, wherein one surface reflects all the light at each bounce and the respective other surface reflects some of the light and transmits some light out, via an output port, at each bounce point. The first pair of opposing surfaces may therefore be referred to as the "waveguide surfaces" of the transparent medium.

The step of polishing at least one surface of the first pair of opposing surfaces to achieve a separation therebetween may comprise rubbing or abrading the surface. It may result in a loss of material from the polished surface and therefore, in effect, a change in the separation between the first and second surfaces of the first pair—i.e., to a change in width of the transparent medium in one dimension. The at least one surface of the first pair of opposing surfaces may be polished until a desired separation between it and the opposite surface of the pair is achieved, I.e., until a desired width of the transparent medium is achieved. The at least one surface of the first pair of opposing surfaces may be polished in a controlled manner, so that it loses material from the surface substantially evenly across its surface area, such that the separation between the first and second surfaces of the first pair is (or, becomes) largely even and consistent, across much of the width of the transparent medium. The separation between the two surfaces may be measured in a direction substantially orthogonal to a plane defined by (a large part of) the at least one surface of the first pair of opposing surfaces.

The step of polishing at least one surface of the first pair of opposing surfaces to achieve a separation therebetween may comprise polishing a face of the entire structure of the cladded waveguide, including the at least one surface of the first pair of opposing surfaces of the transparent medium and the corresponding surface(s) of the protective layer(s) that it is bonded to. Because it is in a different (orthogonal) direction to the first polishing step, the step of polishing the at least one surface of the first pair of opposing surfaces comprises (at least substantially) removing the imperfections such as non-straight edges and rounded or chamfered corners that the first polishing step (of a first surface of the second pair of opposing surfaces) introduced. Because it also involves polishing the protective layer(s) attached to the transparent medium, and because the protective layers preferably sandwich the transparent medium (I.e., cover both surfaces of the second pair of opposing surfaces), the step of polishing at least one surface of the first pair of opposing surfaces may result in edges and/or corners of the protective layer(s) becoming imperfect, such as becoming rounded or chamfered. However, this is generally not a problem as the protective layers are not intended for use as a waveguide, and so will not introduce defects into the image, the light of which is to be guided by the waveguide, between the protective layers. The presence of the protective layer(s) ensures that the transparent medium is not at the outer extremes of the structure, such that it is shielded, by the protective layers, from the potential negative effects of polishing. Therefore, the step of polishing at least one surface of the first pair of opposing surfaces does not introduce roundness or imperfection to the transparent medium (I.e., to the core waveguide) itself, but instead enables previously-introduced imperfections to be removed.

The protective layer may comprise a cladding. The/each protective layer may have a refractive index ($n_2$) that is less than the first refractive index ($n_1$) of the transparent medium. The difference in refractive index between the transparent medium and the protective layer(s) may enable total internal reflection of light within the transparent medium to occur, at an interface between the transparent medium and the protective layer, at least for a predefined angle or range of angles of incidence of light on said interface. The input port of the transparent medium may be configured to accept input light at an angle or angles that enable(s) total internal reflection to occur at that interface.

The step of bonding the protective layer to the transparent medium may comprise fusion bonding or heating, and/or any other suitable attachment steps.

The step of bonding the protective layer to the transparent medium may be preceded by a step of applying (e.g., depositing) an optical coating to the at least one surface of the second pair of opposing surfaces, wherein the optical coating has a refractive index ($n_2$) that is less than the first refractive index ($n_1$) of the transparent medium. The optical coating may therefore be responsible for providing total internal reflection of light within the transparent medium, at an interface between the second pair of opposing surfaces and a surrounding medium or material (I.e., between the transparent medium and the protective layer).

The step of applying an optical coating may be followed by a step of adding an adhesive layer, before bonding the protective layer to the transparent medium. Alternatively, the optical coating itself may comprise an adhesive, such that the adhesive performs a dual function of enabling total internal reflection and adhering the transparent medium to the protective layer(s). When the optical coating and/or the adhesive provides the circumstances for total internal reflection to occur, the protective layer need not necessarily a have a refractive index ($n_2$) that is less than the first refractive index ($n_1$) of the transparent medium. In such embodiments, the protective layer may in fact be formed from the same material same as transparent medium.

In some embodiments, the method further comprises removing the or each protective layer from the at least one polished surface of the second pair of opposing surface. This step may be performed after the step of polishing at least one surface of the first pair of opposing surface to achieve a (second) separation therebetween (e.g. to achieve a desired width). In other words, the step of removing the or each protective layer may be performed after the second polishing step. In such cases, the manufactured waveguide may not comprise the or each protective layer. As described above, after the second polishing step, imperfections in the first surface of the second pair of opposing surface may have been removed but imperfections may have been introduced to the protective layer. However, this is generally not a problem as the protective layers are not intended for use as a waveguide. Thus, if the protective layer(s) is/are removed after the second polishing step, this leaves a waveguide in which imperfections have been removed and without a protective layer. In embodiments in which the protective layer comprises a cladding, it may be the cladding that is removed. Any coating (such as an optical coating) applied between the protective layer/cladding and the transparent medium may remain. In other words, the manufactured waveguide may comprise the (optical) coating, but not the protective layer/cladding.

The step of bonding a protective layer to the at least one polished surface of the second pair of opposing surfaces may comprise reversibly bonding the protective layer to the at least one polished surface. As used herein, reversible bonding may mean that protective layer is removable from the transparent medium. This may be, for example, after application of force, heat, radiation and/or a chemical solution (including water). If an adhesive is used to bond the protective layer to the transparent medium, a reversible adhesive may have been used.

The adhesive may be partially or totally absorbing to visible light for waveguiding. This can make up for any possible imperfections that might exist in the optical coating, which might otherwise let light escape through the second pair of opposing surfaces of the transparent medium.

A reflective coating may be added to a first surface of the first pair of opposing surfaces. This step may introduce or enhance the ability of the first surface of the first pair of surfaces (I.e., of the waveguiding surfaces) to reflect light within the waveguide, towards the second surface of the first pair, at one or more "bounce points". The reflective coating may be omitted from a section, or part, of the first surface of the first pair, wherein the omitted part comprises the input port, for entry of light into the transparent medium.

A graded coating may be added to the second surface of the first pair of surfaces. This step may introduce or enhance the ability of the second surface of the first pair of surfaces (I.e., of the waveguiding surfaces) to be transmissive-reflective, as required for pupil expansion.

The or each protective layer may have a thickness sufficient to prevent evanescent loss in the waveguide.

According to an aspect, a method is provided of manufacturing a waveguide comprising an input port, an output port, and a transparent medium having a first refractive index $(n_1)$. The method comprises providing, in molten form, a material that, when cooled, will form the transparent medium. The method further comprises providing, in molten form, a material that, when cooled, will form a protective layer abutting the transparent medium, and co-moulding the transparent medium with the protective layer, such that, when the co-moulded structure is cooled, the protective layer abuts a first surface of the transparent medium. The method may further comprise polishing a second surface of the co-moulded structure, said second surface being substantially perpendicular to the first surface of the transparent medium. The method may further comprise polishing a third surface of the structure, said third surface being located substantially opposite the first surface, wherein said third surface is a surface of the protective layer.

According to an aspect, there is provided a waveguide comprising an input port, an output port, a transparent medium and first pair of opposing surfaces arranged to guide a light field through the transparent medium from the input port to the output port by reflection therebetween, wherein a first surface of the first pair of parallel surfaces is partially transmissive-reflective such that the light field is divided at each reflection and a plurality of replicas of the light field are transmitted through a region of the first surface that forms the output port. The waveguide further comprises a second pair of opposing surfaces arranged to guide the light field through the transparent medium from the input port to the output port by total internal reflection, wherein each surface of the second pair of opposing surfaces is clad with a respective layer of material having a refractive index less than that of the transparent medium.

The waveguide may further comprise a third pair of opposing surfaces, which may be referred to as "end surfaces". The third pair of opposing surfaces may not be configured to reflect and/or to transmit light. Alternatively, the third pair of opposing surfaces may be configured to reflect at least some light internally, within the transparent medium.

Alternatively, the third pair of opposing surfaces may be roughened ("frosted") to scatter light which reaches the end surfaces of the waveguide. The waveguide may be configured to avoid light within the transparent medium reaching the third pair of opposing surfaces, at least in some circumstances.

The protective layer may be a cladding having a second refractive index $(n_2)$ that is less than a first refractive index $(n_1)$ of the transparent medium.

The protective layer may be fusion-bonded to, or co-moulded with, the transparent medium. The transparent medium may be polished, before being attached to the protective layer.

An optical coating may be provided between at least one surface of the second pair of opposing surfaces and the respective layer of cladding material, wherein the optical coating has a refractive index $(n_2)$ that is less than the first refractive index $(n_1)$ of the transparent medium.

An adhesive layer may be provided between the optical coating and the respective layer of cladding material. The adhesive may be partially or totally absorbing to visible light for waveguiding. Alternatively, the optical coating itself may comprise an adhesive, such that the adhesive performs a dual function of enabling total internal reflection and adhering the transparent medium to the protective layer(s). When the optical coating and/or the adhesive provides the circumstances for total internal reflection to occur, the protective layer may not necessarily have a second refractive index $(n_2)$ that is less than a first refractive index $(n_1)$ of the transparent medium. In such an embodiment, the protective layer may be formed from the same material same as the transparent medium.

The waveguide may comprise a reflective coating on a first surface of the first pair of surfaces. It may comprise a graded coating on a second surface of the first pair of surfaces. The graded coating may serve to provide or enhance or improve the transmissive-reflective properties of the second surface of the first pair of surfaces.

Each layer of cladding material may have a thickness sufficient to prevent evanescent loss in the waveguide.

The waveguide may be comprised within, or arranged in conjunction with, a projector, such as but not limited to a holographic projector. The waveguide may be comprised within, or arranged in conjunction with, a head-up display (HUD), such as but not limited to a HUD in a vehicle, aircraft, locomotive or other transport means.

The waveguide may be arranged to guide a diffractive or divergent light field therethrough. It may be configured so that most, or all, of any imperfections imparted to the waveguide via an assembly or construction method thereof are restricted to the protective layers, such that a high level of precision and accuracy is maintained in the transparent medium, for output of the light of high-quality image replicas.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events during use of the waveguide.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
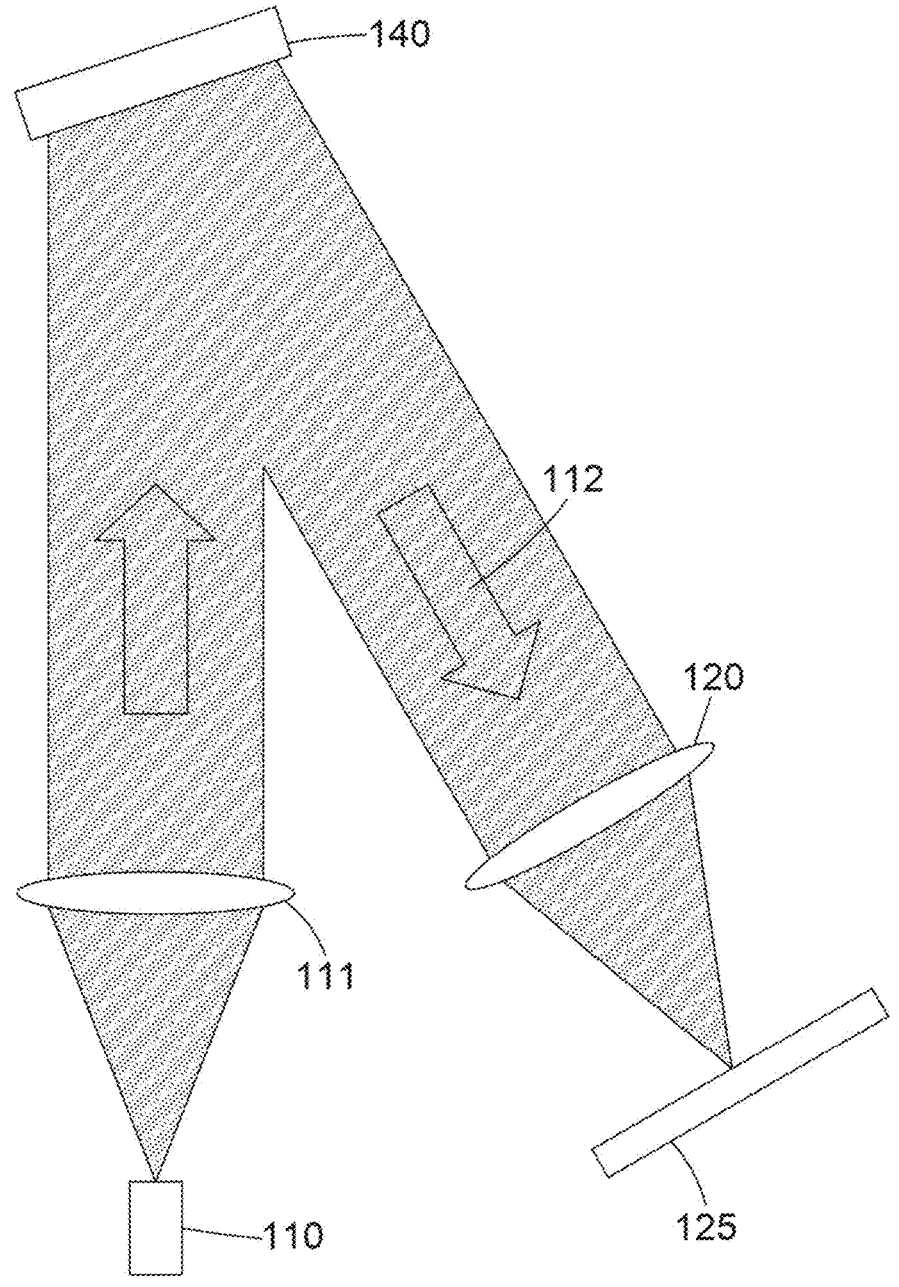
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021 (published as GB2603517A) and incorporated herein by reference, discloses a first hologram calculation method in which eye-tracking and ray tracing are used to identify a subarea of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
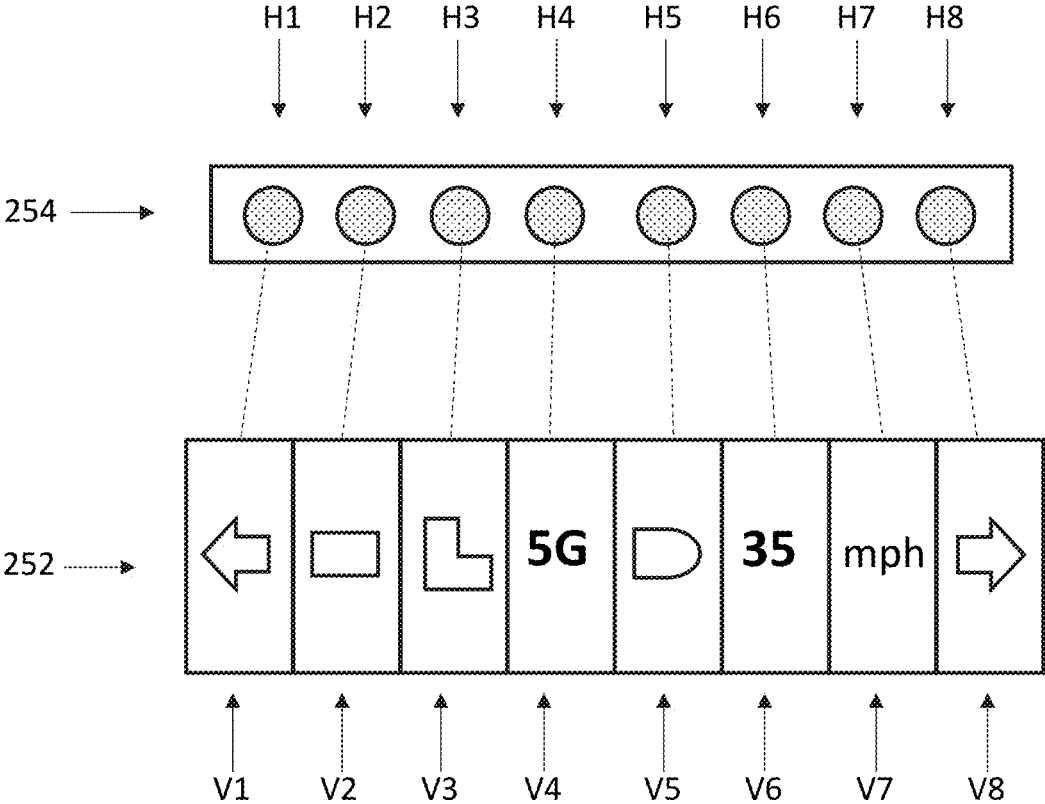
FIG. 2 shows an image for projection comprising eight image areas/components, V1-V8, and cross-sections of the corresponding hologram channels, H1-H8.
Figure 3:
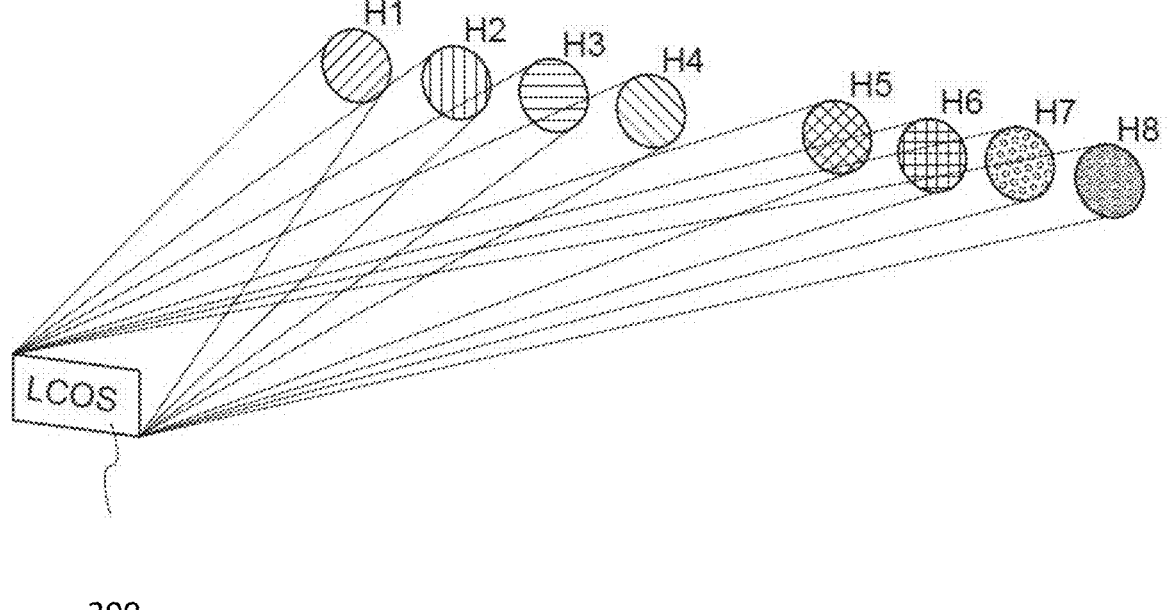
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
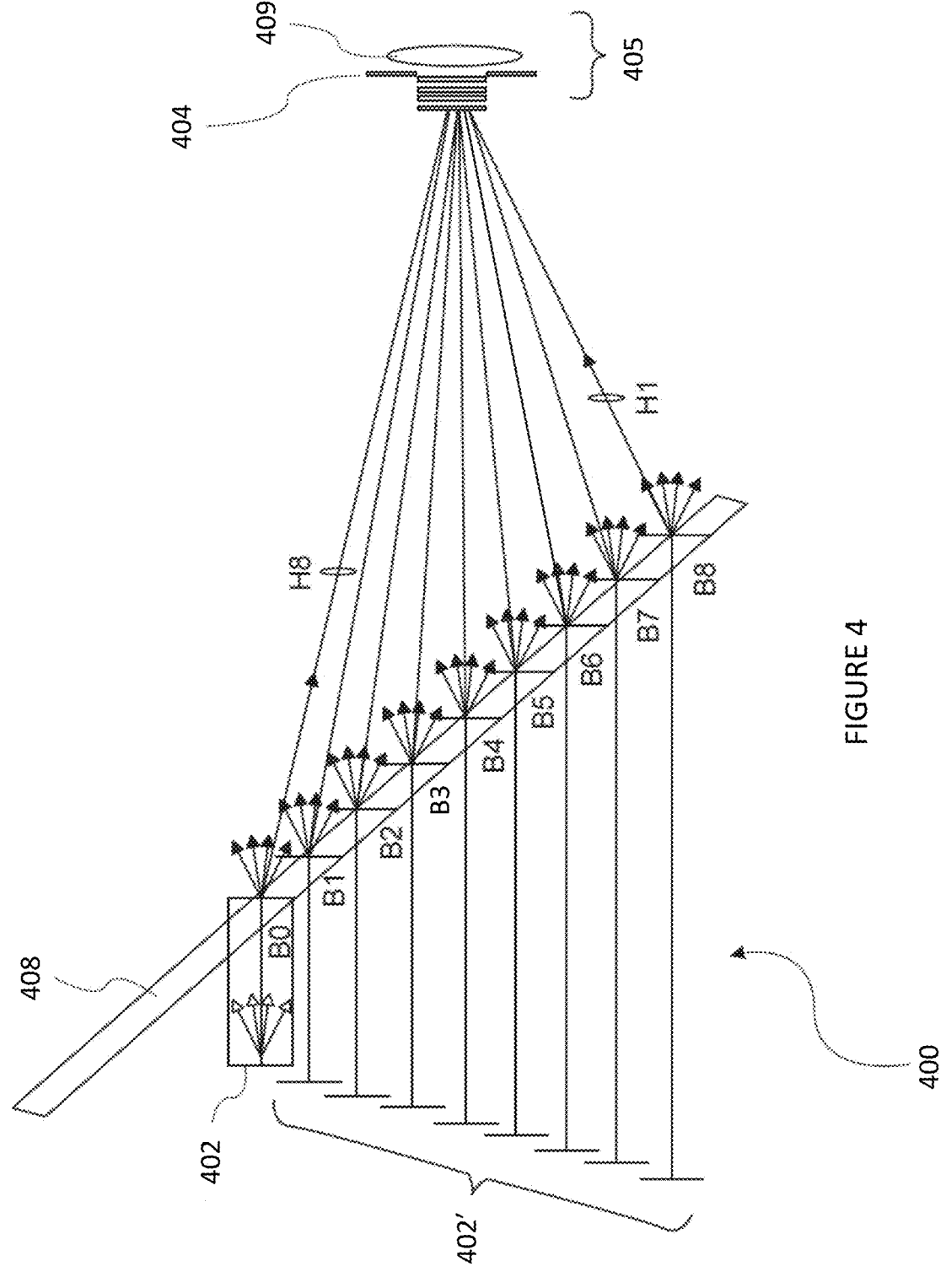
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
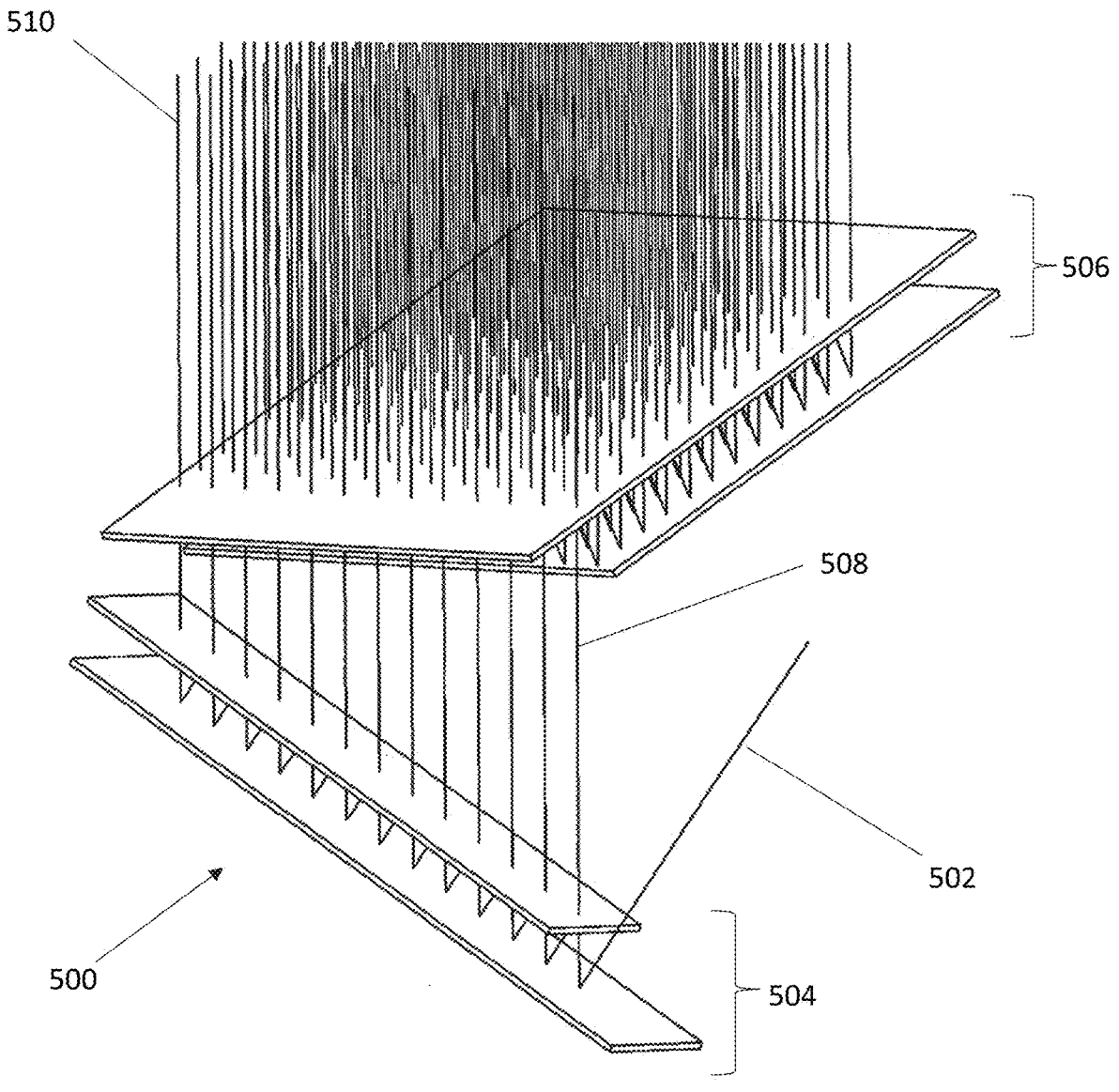
FIG. 5a shows a perspective view of a first example two-dimensional pupil expander comprising two replicators.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
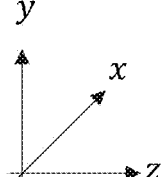
FIG. 5b shows a perspective view of a second example two-dimensional pupil expander comprising two replicators.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524a, 524b are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524a of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524a of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524a. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as they dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated. In embodiments in which pupil expansion is required in two dimensions, the first waveguide pupil expander 520 may be oriented so that the plurality of output light beams are directed (either directly or indirectly, for example via one or more other components, as discussed further below) towards a receiving face of a second waveguide pupil expander, which is arranged to provide pupil expansion in a second direction, substantially perpendicular to the first direction. For example, the first waveguide pupil expander 520 in FIG. 5B is tilted on the XZ plane so the replicas are spaced as required and travel in the z-direction, towards the mirror 530 and on towards the second waveguide pupil expander 540—but this is just one illustrative example and should not be regarded as limiting on the present disclosure.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the deliver of hologram light channels, and their replicas, to the eye-box. Each aperture or window may comprise a plurality of liquid crystal cells or pixels.

Improved Pupil Expander

The inventors have identified limitations of the usefulness and efficiency of pupil expanders in practical applications. For example, the skilled reader will be aware that many practical applications that require the use of pupil expansion have physical space constraints. For example, in automotive head-up displays, it may be desirable for a pupil expander to be provided in a limited space such as under the dashboard of the vehicle. Also, such spaces are often unstable environments, that move or vibrate, which is problematic for many conventional pupil expanders. Moreover, the pupil expander is usually provided as part of a larger display system, or viewing system, which comprises other optical elements, all of which may have to be physically constrained within a limited space. However, known pupil expanders generally require non-optimal compromises to be made between the degree (or, extent) of pupil expansion that is provided and the physical volume in space, and suitability to its surrounding environment, that the pupil expander occupies.

Even more so, the inventors have identified the technical problems associated with using waveguides to replicate/expand the pupil when the light field is a diffracted light field such as a holographic light field from a small display device. Unlike conventional imaging, holography embraces diffraction and it is advantageous to propagate diffracted/diverging light within the waveguide, rather than collimated light, when the image is formed by holographic reconstruction at the eye. A significant problem is that because the necessary display device is so small owing to the small pixel size needed for diffraction, the projection distance needs to be large (in relative terms) and so the size of the light field (in the cross-sectional dimension) also becomes large. Notably, the inventors found that it was possible to effectively "fold" a holographic light field in this dimension and retain all image content (albeit in the hologram domain) by using simple internal reflection from two complementary surfaces of the elongated waveguide—i.e., the other two elongate surfaces which do not contribute to pupil replication/expansion.

The inventors have made recognitions that make it possible to provide a pupil expander for holography, which enables the user to have a wide field of view—by enabling the user to receive all (or, at least a required portion of) the light output by a light emitter (such as an SLM or another pixelated device) with which the pupil expander is used—and also providing the user with a bigger eye-box than is conventionally achievable, thus enabling them to move their head and still see the required light. All of this is provided in a compact, robust and space-efficient manner. This can be understood further from FIG. 6 et seq.

The improved pupil expander described herein—and the methods for manufacturing the same—is described as being a one-dimensional pupil expander, but it can be provided as part of a two-dimensional pupil expander arrangement similar to (but not limited to) the two-dimensional pupil expander arrangement shown in FIG. 5B.

The relative terms 'upper', 'lower', 'side' and 'end' will be used herein in the description, to facilitate understanding and for expediency, however it will be appreciated that the present disclosure is not limited to these relative terms and that the system could be moved, rotated, or translated in any suitable manner whilst still functioning as described herein. Similarly, orthogonal XYZ axes have been used in the figures, and referred to in the accompanying description, for ease of reference and to aid understanding. But these should not be regarded as being limiting.

Figure 6:
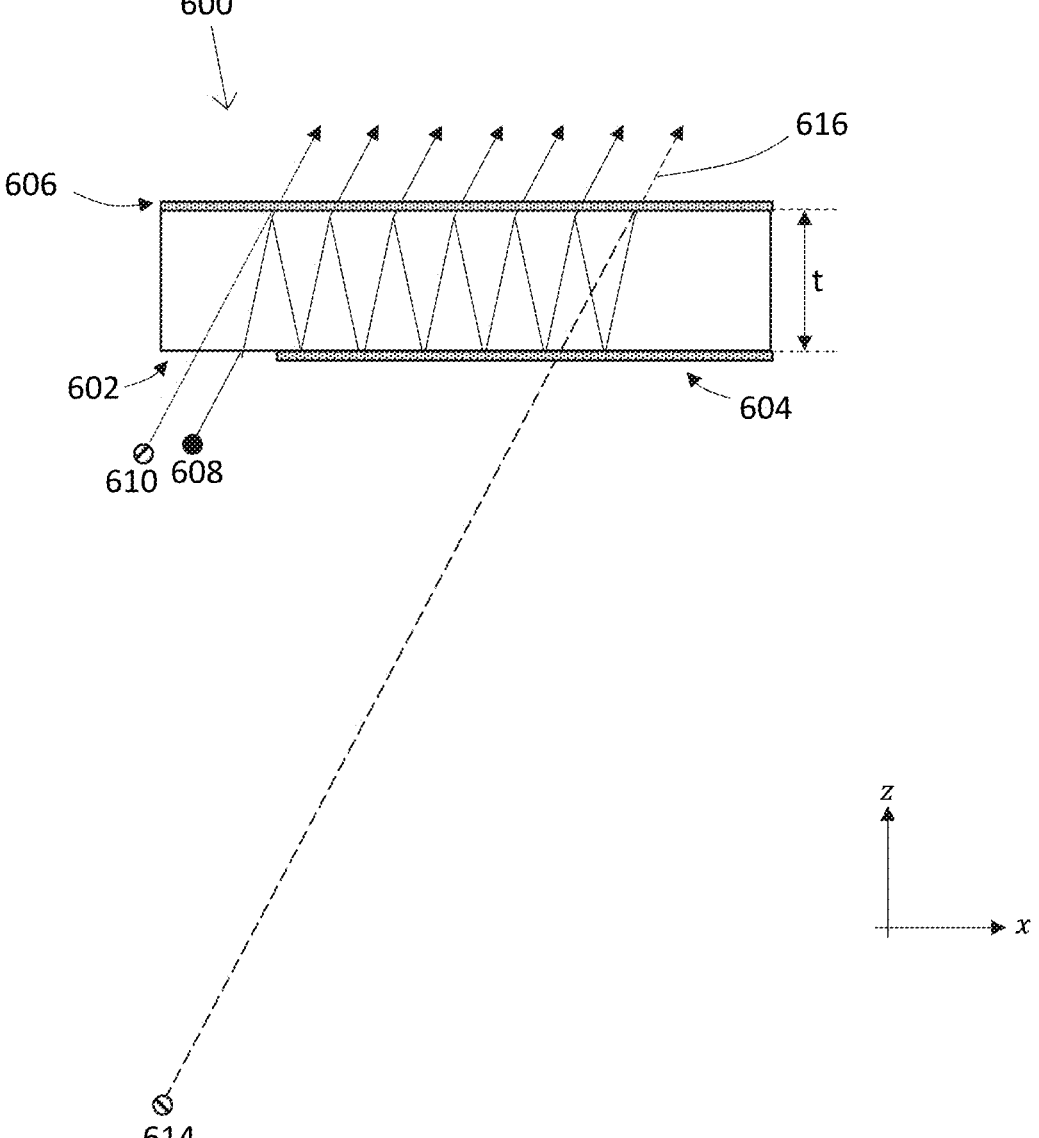
FIG. 6 shows a top view of light propagation through a known one-dimensional pupil expander.

FIG. 6 shows a plan view (I.e., a view from above) of a conventional one-dimensional pupil expander 600, of a "rod" type, similar to the first waveguide pupil expander 520 in FIG. 5B. The one-dimensional pupil expander 600 is not shown as being tilted in FIG. 6, but it could be arranged to adopt any suitable tilt or angle. The one-dimensional pupil expander 600 has an input port 602 in a section of a first elongate side face 604, and has an output port (not specifically labelled) on a second, opposite elongate side face 606 (I.e., on the "upper face" as shown in FIG. 6). The first elongate side face 604 has a reflective surface and the second elongate side face 606 has a transmissive-reflective surface, so as to output multiple replicas of the input light, said replicas being emitted from multiple respective points along the length (in the elongate "x" direction) of the second elongate side face 606. There are seven replicas shown in FIG. 6 but this is an illustrative example only and should not be regarded as limiting.

FIG. 6 shows the input light 608, entering the one-dimensional pupil expander 600. The light may come from, for example, a pixel or pixels on a pixelated display device such as an SLM, on which a hologram is displayed. FIG. 6 further shows a first apparent position 610 of the origin of the received angular content, when the viewer receives light of the first replica 612, from the one-dimensional pupil expander 600, and a second apparent position 614 of the origin of the received angular content, when the viewer receives light of the seventh (i.e., the last, or 'n'$^{th}$) replica 616, from the one-dimensional pupil expander 600. For clarity—the image that the viewer sees or perceives does not change position as the viewer's eye moves around the eye-box. But, for a hologram that divides (in the hologram domain) image content by angle, and because viewer eye-position will determine which angular content will be received from each respective transmission point on the one-dimensional pupil expander 600, the apparent position of the origin of the received angular content (i.e., the apparent position of a point on the hologram or display device, from which the angular content came) changes, between different replicas 612, 616. The skilled reader will understand that the second apparent position 614 is further away from the one-dimensional pupil expander 600 than the first apparent position 610 is, because the light of the last replica 616 has travelled further (I.e., it has a longer pathlength) than the light of the first replica 612, due to the multiple reflections that it 616 has encountered within the one-dimensional pupil expander 600.

FIG. 6 shows that the one-dimensional pupil expander 600 has a "thickness, t" defined between its reflective first elongate side face 604 and its reflective-transmissive second elongate face 606, in the z direction.

Figure 7:
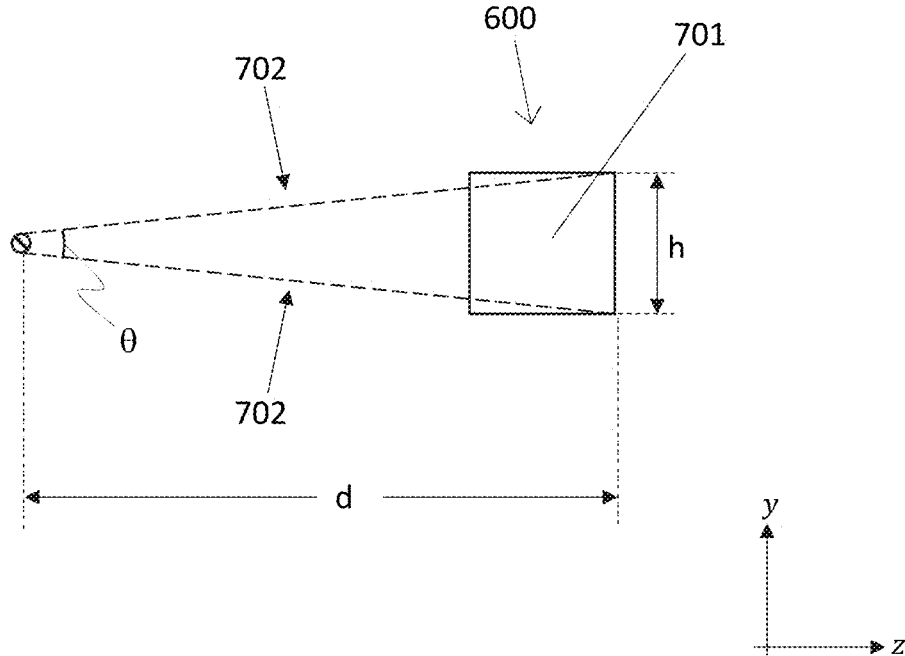
FIG. 7 shows a side view of the known one-dimensional pupil expander of FIG. 6.

FIG. 7 shows a side view (I.e., a view in the YZ plane) of the one-dimensional pupil expander 600 of FIG. 6—in particular, it shows (using a solid rectangle) an "end face" 701 of the one-dimensional pupil expander 600, which is relatively short in both the "y" and "z" directions, as defined in FIG. 7. The end face 701 shown in FIG. 7 is the output end face, which is distal to the input port, in the x direction. There is a point 700 shown in FIG. 7, the light of which is to be guided through the one-dimensional pupil expander 600, in order to be received by a viewer. The light being guided by the one-dimensional pupil expander 600 is diffracted, or diverging, light, and so a light cone 702 extends from the image 700 towards, and through, the one-dimensional pupil expander 600, wherein the light cone 702 extends at an angle θ, which is defined between the upper and lower extremes of the light cone 702, in the YZ plane. In other words, the angle θ defines the angular field of view in the y direction.

As will be understood from FIG. 6, the one-dimensional pupil expander 600 is arranged to generally guide light along its elongate dimension (I.e., in the "x" direction, as defined in FIGS. 6 and 7). However, because the light is diverging light, the size of the light field defined at the "mouth" (I.e., at the opening, or widest part) of the light cone 702 will increase in the y direction, as the distance (in the x direction) that the light cone travels increases. The light that travels furthest through the one-dimensional pupil expander 600 before being emitted from its second elongate side face 606 (i.e., from its upper surface, as defined in FIGS. 6 and 7) will have the longest pathlength and therefore will have the largest light cone size, in the y direction, of all the light within the one-dimensional pupil expander 600. The light cone 702 depicted in FIG. 7 corresponds to that longest pathlength, for the one-dimensional pupil expander 600 of FIG. 6, and shows the height "h", in the y direction, which is conventionally required for the one-dimensional pupil expander 600 to accommodate that light cone 702, without allowing any light to escape out of the one-dimensional pupil expander 600 from any face/surface other than the reflective-transmissive upper surface (i.e., other than from the second, opposite elongate face 606, as shown in FIG. 6).

It is generally desirable to provide optical systems, including waveguides, in a compact and streamlined form. This is particularly useful when the optical system is to be deployed somewhere in which limited space is available, and real estate value is high—such as, for example but not limited to, within in a vehicle. The present inventors have recognised that it is possible to provide a waveguide (or pupil expander) that provides the same pupil expansion functionality as the one-dimensional pupil expander 600 of FIGS. 6 and 7, but in a more compact form. This can be understood in relation to FIG. 8.

Figure 8:
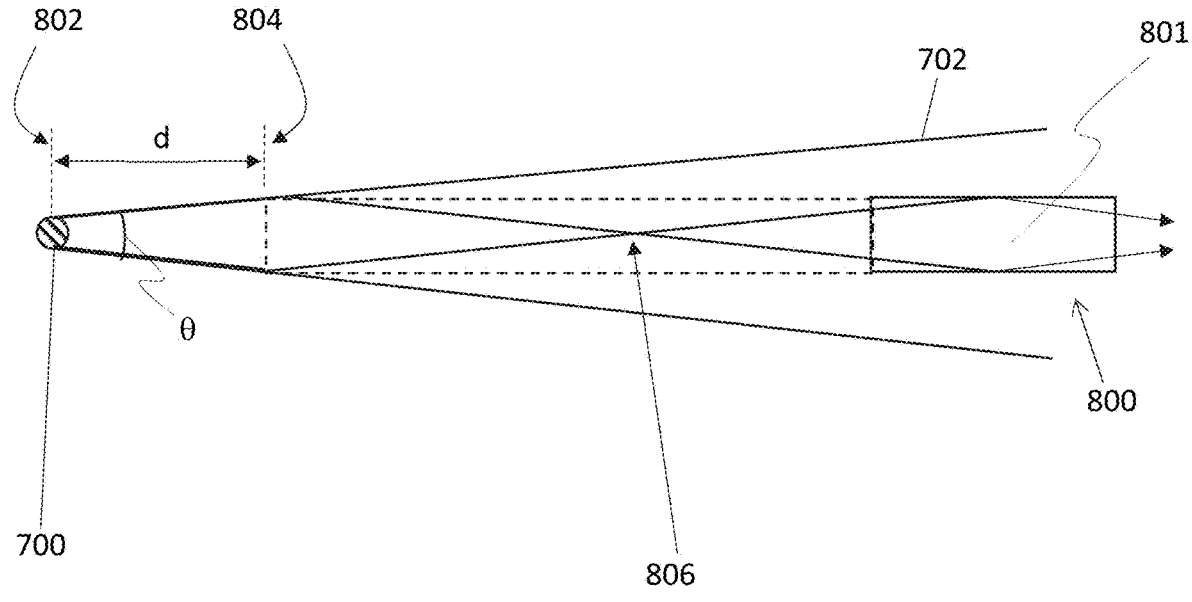
FIG. 8 shows a side view of an improved one-dimensional pupil expander with total internal reflection.
Figure 8:
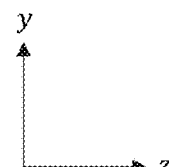

FIG. 8 shows a side view of an improved one-dimensional pupil expander 800 (which, for conciseness, we will refer to from hereon in as a "waveguide 800"). Although not shown in FIG. 8, the waveguide 800 is a rod-type one-dimensional pupil expander, of a similar shape as the first waveguide pupil expander (or, replicator) of FIG. 5B. Therefore, a first elongate side face (an XY face, using the directionality defined in FIG. 8) of the waveguide 800 is partially transmissive-reflective and a second, opposite elongate (XY) side face of the waveguide 800 is reflective. Thus, the first and second elongate (XY) sides form a first pair of parallel elongate faces, wherein the pair is arranged to internally reflect or 'bounce' light between the two faces along the elongate (x) direction of the waveguide 800 and to transmit some light from each of a plurality of transmissions points (or, transmission areas) on the first elongate side face, between the input port at a first end and a second, distal end of the waveguide 800. The first elongate side face may be regarded as being an output port.

FIG. 8 shows—using a solid rectangular line—the output "end face" 801 of the waveguide 800, which is a YZ face, using the directionality defined in FIG. 8. The output end face is located distal to the input port of the waveguide (in the "x" direction), and is relatively short in both the "y" and "z" directions, as defined in FIG. 8. The same point 700 is shown as is shown in FIG. 7, wherein the light cone 702 (of the longest pathlength of light) extends from the image 700 towards, and through, the waveguide 800, at the same angle θ. FIG. 8 shows two dashed vertical lines—the first 802 of which shows the location of the image 700 and the second 804 of which shows the location of the input end face of the waveguide, with a distance "d" defined between the image and the point, with the waveguide 800, at which the size of the light field is greatest, in the "y" direction. This distance "d" is important to defining the overall shape and size of the improved waveguide 800, as discussed further below.

The conventional light cone 702 from FIG. 7 is shown in FIG. 8, but FIG. 8 also shows an alternative, improved light path 806, which is achieved using the waveguide 800. That improved light path 806 is achieved by the light being totally internally reflected by a second pair of elongate faces (I.e., by the XZ faces, using the directionality defined in FIGS. 6 to 8), whilst it travels along the waveguide 800 and is also reflected-transmitted by the first pair of elongate faces (I.e., by the XY faces, using the directionality defined in FIGS. 6 to 8) in a similar manner to that described in detailed above in relation to FIG. 5B.

In broad terms, by using the second pair of elongate faces for total internal reflection of the light (in addition to using the first pair of elongate faces for waveguiding) in accordance with the present disclosure, the waveguide 800 can control and can restrict the size (in a direction orthogonal to the general direction of light propagation in the waveguide 800) of the light cone/light field formed by divergent or diffractive light, and therefore can provide accurate guidance of the light in a more compact physical arrangement. The present inventors have also recognised that improved manufacturing techniques can be adopted, to maintain high image quality from light that is guided through the waveguide 800. This is discussed further in relation to subsequent figures, below.

In more detail; the inventors have recognised that, as described above in relation to FIG. 6, if the input light is diffracted or diverging light (that is, light comprising diverging ray bundles), it will comprise an expanding light cone (as opposed to the one or more parallel beams that are comprised within collimated light), such that the size of the light cone—i.e., the height "h" of the diffractive light field that the end, or mouth, of the cone defines, as illustrated in FIG. 7 herein—increases as the light propagates along its light path. This is a well-established principle of diffractive/diverging light and can be understood, for example, from FIG. 7. The size "h" of the diffractive light field can be seen to depend, based on well-established trigonometric principles, both on the diffraction angle θ and on a distance "d" from the light source at which that size "h" is measured.

The inventors have thus made a further recognition that, at least in some circumstances/arrangements, if diffracted/diverging light is input into an elongate face of a pupil expander in conventional arrangements, there is a risk that the size of the light cone—i.e., the size "h" of the diffractive light field defined by the end, or mouth, of the cone—would exceed the size of the pupil expander along one of its shorter dimensions. For example, with the conventional one-dimensional pupil expander 600 of FIGS. 6 and 7, there is a risk that the size of the diffracted light field would, at some point along its propagation path between the upper and lower elongate (XY) faces, exceed the upper-to-lower height "h" of the one-dimensional pupil expander. If that happened, in a conventional pupil expander, at least some of the light from the input light cone would therefore escape through the upper face and/or the lower face, and thus would not correctly reach the intended viewer. Conventionally, this could only be overcome by using a very large rod, with a significant gap between the upper and lower faces, which is expensive and impractical in many real-world applications.

Thus, the inventors have provided an improved waveguide 800, wherein a second pair of parallel faces is also arranged to guide the light field from the input port towards the output port by at least one internal reflection, which optionally comprises at least one total internal reflection (TIR). Such (total) internal reflection enables the light of the spatially modulated light cone to remain trapped within the improved waveguide 800, and for the light only to be transmitted via the plurality of transmission points defined on the elongate face that is specifically intended for pupil expansion. Thus, light comprising desired information, such as image-related information (such as, for example, encoded light of a hologram corresponding to an image) is not lost through the secondary faces of the improved waveguide 800.

In short, the inventors found that it was possible to effectively "fold" the diffracted/holographic light field within the waveguide 800 (using additional reflections from a pair of opposing surfaces, other than the pair of "waveguiding" surfaces) in order to retain all the necessary diffracted/holographic light content for receipt/reconstruction at the eye of a good quality image. They also found that it was possible to accurately and sufficiently compensate for the additional reflections, as part of a hologram calculation process. This folding of the light field is shown in FIG. 8 as the improved light path 806. In the example illustrated in FIG. 8, the light is totally internally reflected (by the XZ faces, in this example) twice within the waveguide 800, as it travels between the input and output ends. But this number of total internal reflections is just an example and should not be regarded as limiting.

Looking again at FIG. 8, it can be seen that using total internal reflections to effectively fold the light field as it propagates in the x direction means that the maximum size (in the y direction, using the directionality defined in FIGS. 6 to 8) of the light field that the waveguide 800 is required to accommodate, for any given location and size of light source, it much smaller than it is for a conventional waveguide under equivalent conditions. This is because the distance "d" between the light source and the location at which the size of the light field is at a maximum is much smaller, for the improved waveguide 800, as compared to the conventional waveguide illustrated in FIGS. 6 and 7. Based on well-known trigonometric principles, this means that the size of the improved waveguide in a direction orthogonal to the direction of light propagation (I.e., the size in the y direction, using the directionality defined in FIGS. 6 to 8) can be much smaller for the improved waveguide than it is for conventional waveguides, for an equivalent angular field of view. Thus, the improved waveguide 800, and any optical system that it forms part of, can be smaller and more compact than is conventionally possible, whilst not compromising on accuracy or on range of angular image content that is visible.

The folding of the light field as it propagates through the waveguide 800, as a result of (total) internal reflection, results in at least part of the light field content being inverted and flipped from the bottom of the cone to the top of the cone (or vice-versa). However, in accordance with the present disclosure, these effects may be compensated for. For example, a hologram may be computed using any suitable approach, such as but not limited to approaches uses eye tracking data, to compensate for the folding/flipping of the light field within the waveguide 800.

In accordance with the present disclosure, at least in some embodiments, the light launch conditions should be actively controlled to ensure that the light within the improved waveguide 800 internally reflects off the second pair of opposing faces, in addition to being reflected/transmitted by the first pair of opposing faces. For example, this may involve controlling an angle at which the input light enters the waveguide 800. Such an angle may be required in order for propagation, at least between the first pair of opposing faces, to be established.

Figure 9:
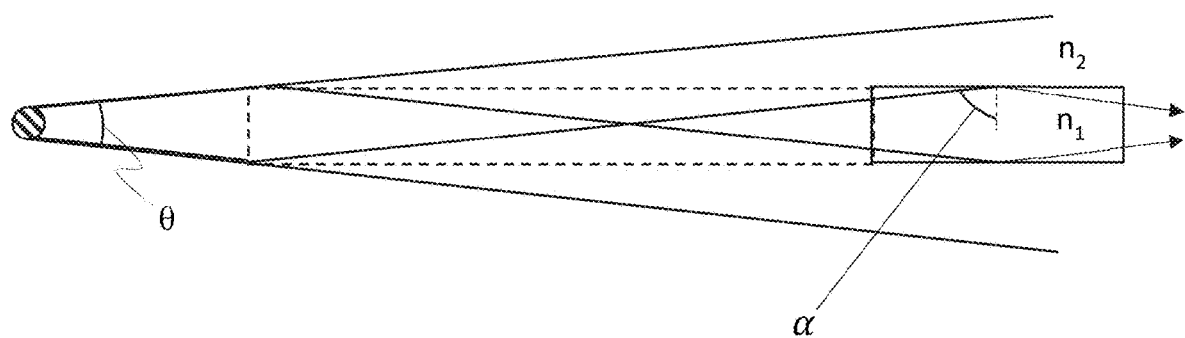
FIG. 9 shows an angle θ defining an angular field of view for which waveguiding and total internal reflection is provided in the improved one-dimensional pupil expander of FIG. 8.

Certain conditions relating to the refractive index of the material of the waveguide, and of a surrounding material/ medium, must also be met in order for reflection, and in particular total internal reflection (TIR), to occur in the waveguide 800. This can be understood further in relation to FIG. 9, which shows the image 700 and the improved waveguide 800, with a light cone being emitted from the point 700 and being defined, between its upper and lower limits, by an angle θ. FIG. 9 also shows the distance "d" between the image 700 and a position at which the size of the light cone is at a maximum. FIG. 9 also shows that the waveguide has a first refractive index $n_1$ and the material either side of the waveguide 800 (that may be air or may be another material, as discussed in more detail below) has a second, different refractive index $n_2$. In order to achieve total internal reflection, in accordance with well-established principles, the second refractive index $n_2$ should be lower than the first refractive index $n_1$ and an angle of incidence "α" at which the light approaches the interface from the waveguide 800 to the other material and is defined relative to the normal of the interface) must be more than the critical angle for that interface. This can also be expressed mathematically as shown in Equation (1), below:

$$\sin \alpha > \frac{n_2}{n_1}, \text{ where } \alpha = \frac{\pi}{2} - \sin^{-1}\left[\frac{\sin\frac{\theta}{2}}{n_1}\right] \quad (1)$$

For the avoidance of doubt: $n_1$ is the refractive index of the core, $n_2$ is the refractive index of the clad, θ is the extent of the angular content of the light after the display device in air, and α is the angle of incidence of the bounding ray of the content in the core onto the core-clad interface in radians.

When the waveguide 800 is arranged and configured so that the conditions for total internal reflection are met, both faces of the second pair of parallel faces (i.e., the XZ faces, using the directionality defined in FIGS. 6 to 8) will reflect the light that hits them back into the waveguide 800, such that the light cone will effectively fold in on itself. Therefore, the light will continue to be divergent but will not expand further (in the Y direction, using the directionality defined in FIGS. 6 to 8). Therefore, the height "h" of the waveguide 800 can be much smaller than is achievable using conventional waveguides.

The improved waveguide 800 may be formed from any suitable material, in order for it to function as described herein. For example, it may comprise a glass block. In some cases, the inherent difference between the refractive index 'n' of the improved waveguide 800 and surrounding air will enable the second pair of parallel faces to provide internal reflection—e.g., total internal reflection—and thus to keep the diffractive light inside the improved waveguide 800, except when it is transmitted in a controlled manner from the output ports on the reflective/transmissive surface of the first pair of parallel faces. In other embodiments, at least one surface of the second pair of parallel faces may be coated or otherwise added to, by another material, in order to achieve the desired internal reflection and light trapping. This is discussed further below, in relation to subsequent figures.

The light output from the improved waveguide 800 comprises a plurality of replica light beams, output from a corresponding plurality of transmission points (not specifically shown in FIG. 8) on a first elongate side face. The output light is emitted from the transmission points at an angle (not specifically indicated in FIGS. 8 and 9), wherein each of the output light beams is substantially parallel to each of the respective others. In some embodiments, pupil expansion is provided in only one direction. In other embodiments in which pupil expansion is provided in two dimensions, a second waveguide pupil expander may be provided, and, optionally, a mirror and/or a waveguide coupler and/or any other suitable optics may be provided between the first and second waveguide pupil expanders.

Thus, a display system is provided comprising a first waveguide pupil expander comprising an input port, output port, a first pair of parallel faces and a second pair of parallel faces, wherein the first pair of parallel faces are orthogonal to the second pair of parallel faces, wherein the first pair of parallel faces are arranged to light guide a diffracted light field from the input port to the output port by internal reflection therebetween and wherein a first face of the first pair of parallel faces is partially transmissive-reflective such that the light field is divided at each internal reflection and a plurality of replicas of the light field are transmitted through a region of the first face forming the output port, and wherein the second pair of parallel faces are also arranged to light guide the light field from the input port to the output port by at least one internal reflection. Each at least one internal reflection may be a total internal reflection as understood by the person skilled in the art of optics. The second pair of parallel faces are not arranged to provide pupil replication by allowing partial transmission and, optionally, both faces thereof may be arranged for perfect light guiding to the output port—i.e. 100% (or near 100%) reflection.

The improved waveguide 800 disclosed herein enables a diffracted light field to be propagated therethrough, and so to be replicated in a first dimension. Thus, for example, light of a hologram—i.e., light which has been spatially modulated by a hologram displayed on an SLM or other display device but that has not been transformed to form a holographically-reconstructed image—can be propagated and expanded by the improved waveguide 800. Each "replica", or output light beam, formed by the improved waveguide 800, is effectively a replica of the hologram because the light is spatially modulated in accordance with the hologram. Informally, it can be said that the light is "encoded" with the hologram, and the hologram is replicated by the waveguide.

As will be appreciated further from the discussion of subsequent figures, below, the improved waveguide 800 is advantageous because it reduces the overall size and weight of the display system in which it is comprised.

The improved systems disclosed herein enable diffracted or diverging light to be replicated in at least one dimension, via one or more waveguide pupil expanders, which has not been achievable with conventional viewing systems, and certainly not for relatively high diffraction angles. As a result, light output by a diffractive structure, including but not limited to light that has been encoded by a hologram, can be replicated in one or more dimensions before being transmitted to a viewer. Such replication enables the viewer to experience a larger eye-box, within which their eye(s) may be located whilst still capturing all angular content, thereby enabling the viewer to see or perceive a complete image (such as an image corresponding to the hologram) from a larger number of different eye positions.

The present inventors have made recognitions, to improve the manufacture of an improved waveguide, to ensure a high quality image is seen by the viewer, via the improved waveguide. They have recognised that the quality of the edges of the waveguide/pupil expander along the direction of expansion (I.e., along the "x" direction in the directionality defined in FIGS. 6 to 9) are critical to achieving a high image quality. Any chamfering, chips or roundedness of these edges can result in a significant degradation of the target image, e.g., bright or dark lines or "ghost" images offset from the intended image may be seen, or increased background light from scattering, which reduces achievable contrast, may be observed. The present inventors have therefore devised an improved approach to manufacturing a waveguide that functions in the manner of the waveguide 800 of FIGS. 8 and 9, in order to ensure high quality images.

Figure 10:
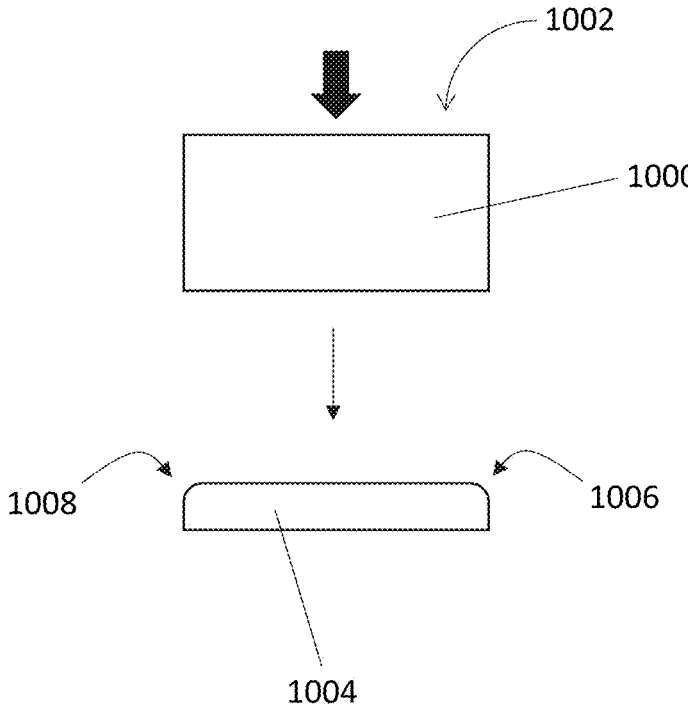
FIG. 10 shows a transparent medium used to form a known one-dimensional pupil expander, before and after conventional polishing.

Conventionally, a glass block for waveguiding may be made by polishing to the desired dimensions. However, the polishing process inherently reduces the quality of the edges of the face which is polished. FIG. 10 shows a side view of a conventional (usually mass-produced) glass block 1000 before polishing, with sharp corners. FIG. 10 further shows, at the bottom, the polished block 1004, after the top surface 1002 has been polished to achieve a desired height/thickness. As can be seen, the corners 1006, 1008 of the surface 1002 that has been polished are not perfectly sharp, but are now rounded/chamfered, which may affect the quality of the images that can be holographically reconstructed via the pupil expander. To overcome this limitation, the present inventors have devised a suitable structure for providing one-dimensional pupil expansion with total internal reflection. The structure—shown in two-dimensional view at the bottom of FIG. 11A and three-dimensional view at the bottom of FIG. 11B—comprises a layered arrangement, with the waveguide at the core, sandwiched between two cladding layers either side. In some embodiments, there may be only two layers, comprising a waveguide and one cladding layer, and in some embodiments, there may be multiple cladding layers on at least one side, meaning that in total the structure has more than three layers. However, the crux of the arrangement is that the waveguide is protected on one or both sides by a cladding, wherein the cladding protects the core during at least some stages of manufacture or polishing, as a result of which the core waveguide can have sharp, well-defined corners and edges, such that the waveguide remains largely defect free.

Figure 11A:
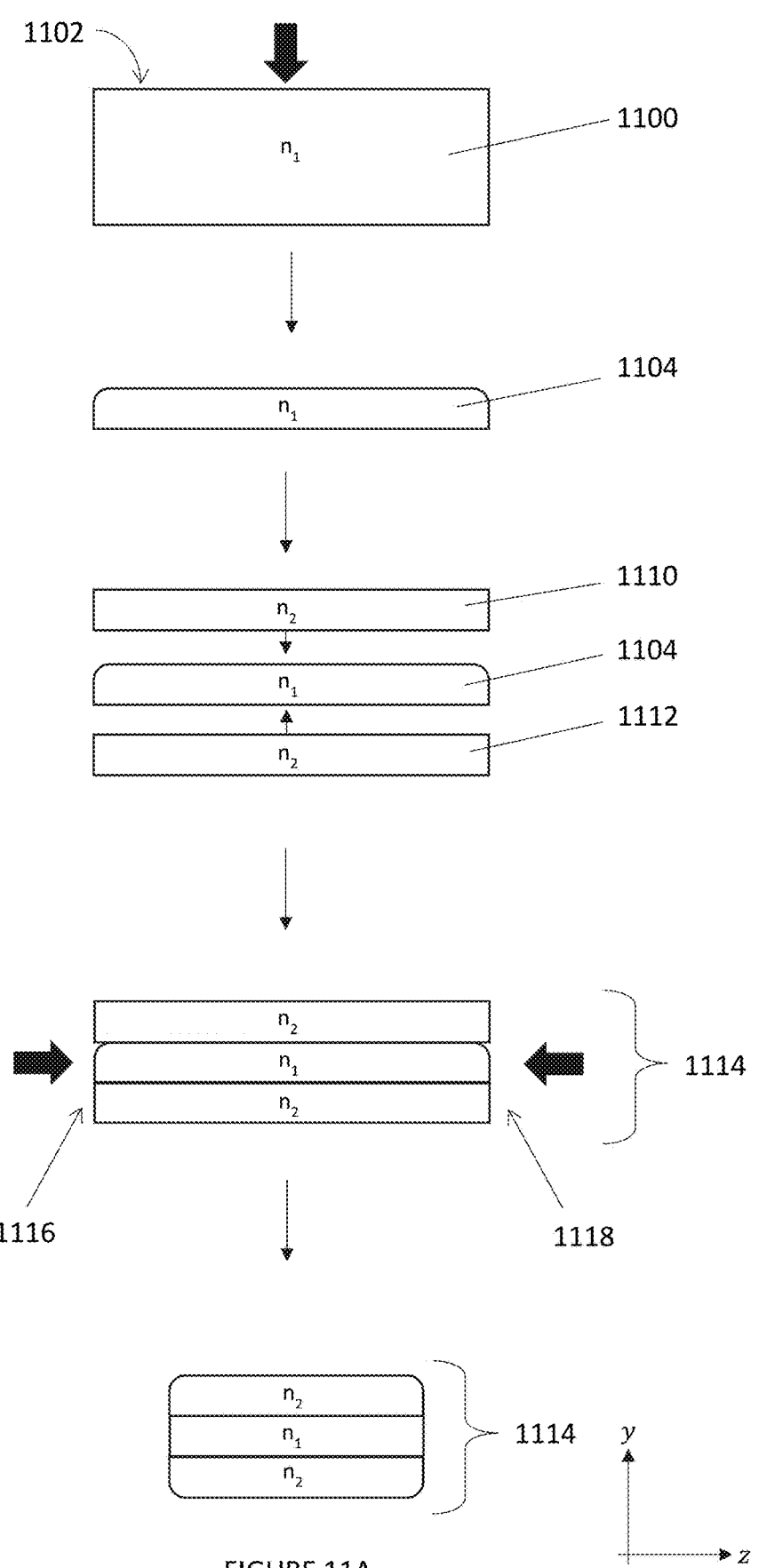
FIG. 11A shows a first set of steps for providing an improved one-dimensional pupil expander, with protective layers sandwiching a core waveguide.

FIG. 11A shows a first method by which the improved waveguide may be provided. It starts with a glass block 1100, similar to the glass block 1000 shown in FIG. 10. Although the term "glass" is used, the skilled reader will appreciate that the glass block 1100 may be formed from any suitable material. It should preferably have low absorption in the visible wavelength range. For example, it may comprise glass having a refractive index "n" in the range 1.3 to 1.7 such as 1.4 to 1.6.

The glass block 1100 has a first refractive index, $n_1$, which is greater than the refractive index of air (I.e., is greater than 1.) The block 1100 may be mass-produced and/or of a standard size, with a height greater (in a direction orthogonal to the elongate pupil expansion direction—I.e., in the "y" direction as defined in FIG. 11A) than the desired/required height of the improved waveguide that is to be provided. As detailed above in relation to FIGS. 7 to 9, the desired/required height may depend on several factors including: the size and location of the source of the light that is to be relayed to the viewer (which may be holographic light); the distance between the waveguide and the light source; the intended/required length (in the pupil expansion direction) of the waveguide—and the number of transmission points for pupil expansion—and so on. The block 1100 should also be thicker (in the other direction, orthogonal to the elongate pupil expansion direction—i.e., the "z" direction as defined in FIG. 11A) than the intended/desired thickness of the waveguide.

Figure 12A:
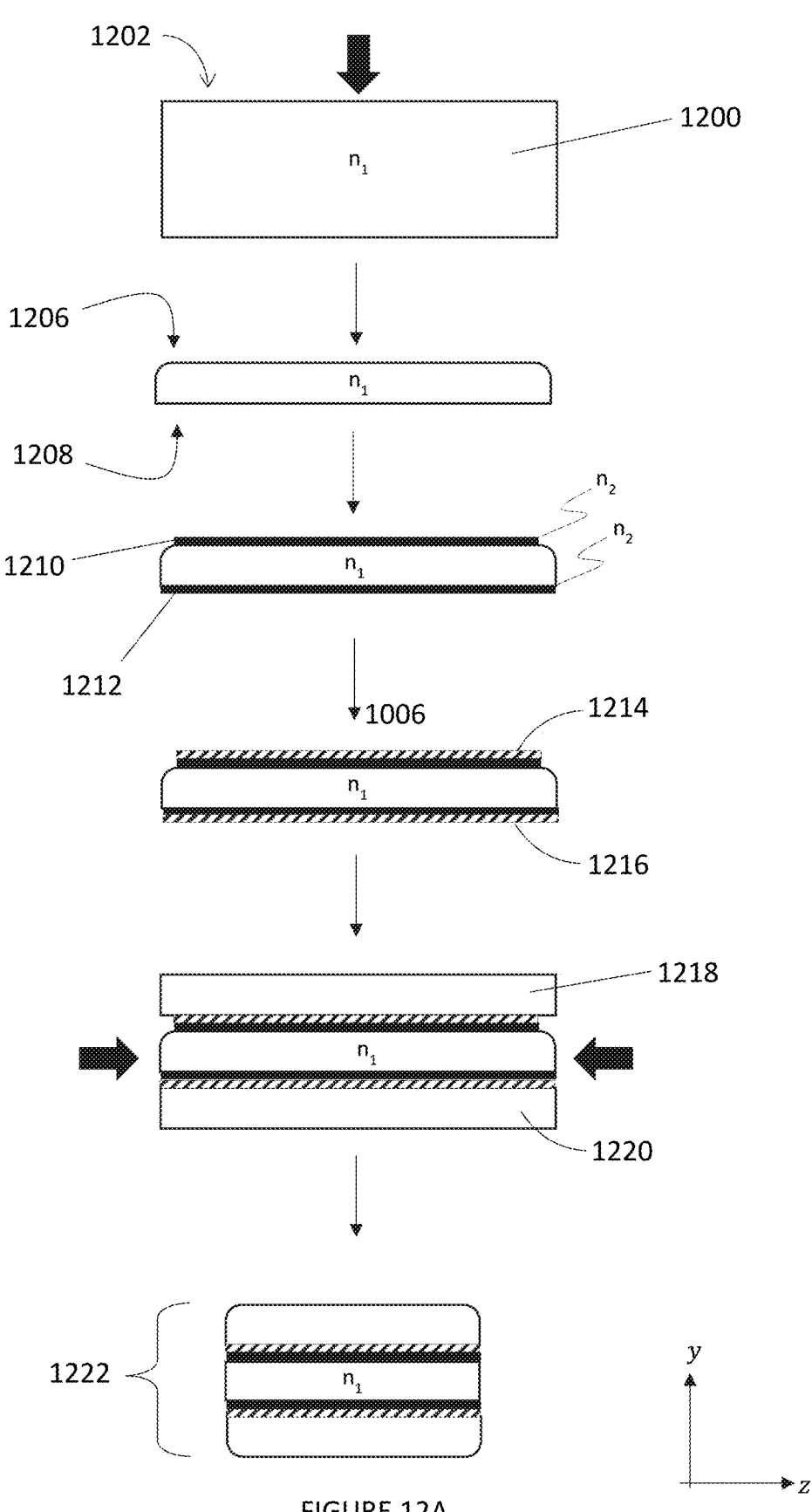
FIG. 12A shows a second set of steps for providing an improved one-dimensional pupil expander, with protective layers sandwiching a core waveguide.

As a first step in the method, a face 1102 of the block 1100 is polished, to remove surface material and thereby achieve a desired (reduced) thickness, to result in the polished block 1104 shown in FIG. 11A, which will form the "core" waveguide of the structure. In FIGS. 11A and 12A, the thick arrows indicate polishing steps, and directions. The face 1102 that is polished is not one of the elongate faces that will serve as the reflective or transmissive-reflective face of the waveguide (an XY face, using the directionality of FIG. 11A), but instead is one of the other elongate faces (an XZ face, using the directionality of FIG. 11A) that will provide the additional total internal reflection, to accommodate and trap the diverging/diffractive light, as detailed above. For conciseness, we will refer to them as the TIR (total internal reflection) faces 1106, 1108.

It can be seen that, as a result of the polishing process, the corners of the polished face 1106 of the polished block 1104 are not perfectly sharp or right-angled but instead have a rounded or chamfered profile. This is addressed by subsequent steps of the method, as will be understood further from the following description. FIG. 11A shows that only one face 1102 of the original glass block 1100 is polished. It is possible to polish the opposite face as well, however this will often be undesirable since polishing typically results in imperfect edges and corners of the waveguide, which this method seeks to avoid and reduce.

Once the polished block 1104 is of the correct thickness, it is then attached, on either side via the TIR faces 1106, 1108, to a protective material that has a second, lower refractive index $n_2$. First 1110 and second 1112 layers of the lower refractive index material may be attached, respectively, to the first 1106 and second 1108 TIR faces by any suitable attachment means. For example, they may be fusion bonded thereto. This forms a protected or "cladded" waveguide structure 1114, as shown in FIG. 11A, with the polished block serving as a "core waveguide" 1104 between two cladding/protective layers 1110, 1112.

The protective layers 1110, 1112 of the second material may be made of a lower refractive index glass, or any other suitable material that enables the core waveguide to function as a pupil expander as detailed above in relation to earlier figures. For example, the lower refractive index material may be a dielectric material having a refractive index in the range 1.3 to 1.5 such as 1.35 to 1.45. The thickness of the protective layers 1110, 1112 should preferably be sufficiently high to prevent evanescent loss from the pupil expander. By way of non-limiting example, possible materials for the protective layer(s) include N-BK10 and N-FK5. Each of the protective layers may be very thin, such as less than twenty microns thick, such as less than ten microns thick, such as less than five microns thick, such as one to two microns thick.

The protective layers 1110, 1112 of the second material are shown as being rectangular in cross section in FIG. 11A, however in practice they need not be perfectly rectangular (or rectilinear) in cross section. They should be at least of a similar thickness (in the z direction) and width (in the elongate x direction) as the core waveguide 1104—or, as the desired final thickness and width of the core waveguide 1104—to ensure that the layers cover the whole cross-sectional area of the respective TIR faces 1106, 1108 of the core waveguide 1104.

Once the cladded waveguide structure 1114 has been formed, the waveguide faces 1116, 1118 (I.e., the elongate faces of the core waveguide 1104 that will perform a waveguide function, once suitably finished, and the corresponding faces of the respective layers either side—which are the XY faces, using the directionality of FIG. 11A) of the whole structure 1114 are polished. The polishing reduces the size of the cladded waveguide 1114 in the thickness direction (I.e., in the z direction, using the directionality of FIG. 11A). The polishing is on both waveguide faces 1116, 1118, though in some embodiments it may be possible/preferable to polish one side more than the respective other. In any case, the polishing preferably should be carried out at least until the rounded/chamfered corners of the core waveguide (I.e., of the polished block) 1104 have been worn away, to leave straight edges and sharp, substantially right-angled corners on the core waveguide 1104. As can be seen from FIG. 11A, the layers 1110, 1112 either side of the core waveguide 1104 bear the brunt of the polishing, and have rounded/chamfered corners as a result—at the top and bottom of the structure 1114, respectively—however the core waveguide 1104 becomes sharply defined, at least when viewed in the YZ plane of FIG. 11A.

As an alternative to bonding the core waveguide 1104 to the lower refractive index protective layers 1110, 1112 either side, the cladded waveguide 1114 structure could optionally instead be formed by co-moulding the core waveguide 1104 and the protective layers 1110, 1112 together into a single piece. This would result in a similar structure to the cladded waveguide 1114 shown at the bottom of FIG. 11A. In either case, the result is a one-dimensional core waveguide (or, pupil expander) with lower refractive index protective layers on the top and bottom surfaces.

Figure 11B:
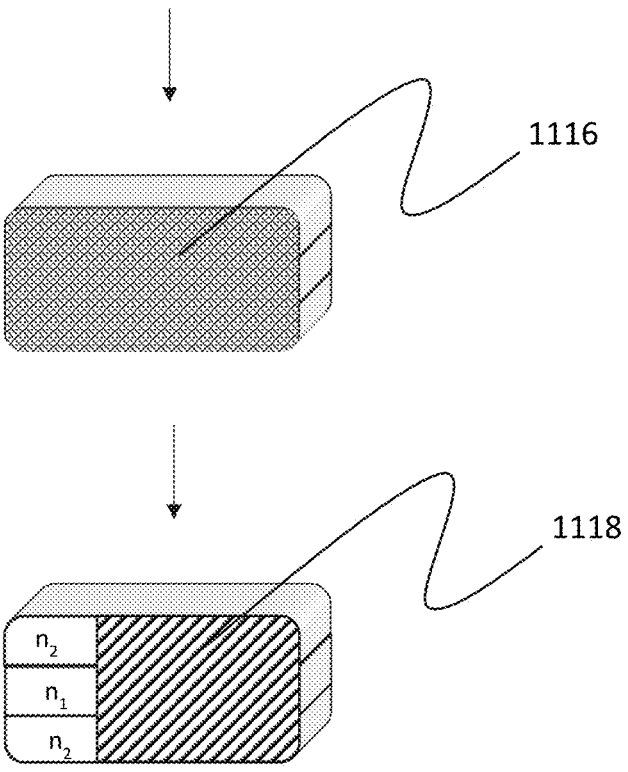
FIG. 11B shows the exit and entrance surfaces of the improved one-dimensional pupil expander formed by the steps of FIG. 11A.

FIG. 11B shows a three-dimensional view of the cladded waveguide 1114 of FIG. 11A, with the directional axes rotated vis-a-vis FIG. 11A. At the top, it shows the output (or, exit) waveguide face 1116 (from which a plurality of replicas will be transmitted, in practice) and at the bottom it shows the input (or, entrance) waveguide face 1118 (via which light will enter the structure). The exit waveguide face of the core waveguide 1104 and the corresponding faces of the layers either side thereof (I.e., the whole exit face 1116 of the cladded waveguide structure 1114) are coated with a graded coating, to ensure that the light intensity of the replicas emitted from the exit face 1116 is approximately uniform over the length of the waveguide. Conversely, a high reflectivity coating is applied over the majority of the entrance face 1118 of the cladded waveguide 1114 to reflect light within the waveguide towards the exit face 1116. It can be seen that one region of the entrance face 1118 is not coated. This is the input port, via which light will enter the structure 1114, in practice.

FIG. 12A shows another method by which the improved waveguide may be provided. It also starts with a glass block 1200, similar to the glass block 1000 shown in FIG. 10. Again, although the term "glass" is used, the skilled reader will appreciate that the glass block 1200 may be formed from any suitable material. It should preferably have low absorption in the visible wavelength range.

The glass block 1200 has a first refractive index, $n_1$, which is greater than the refractive index of air (I.e., is greater than 1.) The block 1200 may be mass-produced and/or of a standard size, with a height greater (in a direction orthogonal to the elongate pupil expansion direction—I.e., in the "y" direction as defined in FIG. 11A) than the desired/required height of the improved waveguide that is to be provided. As detailed above, the desired/required height may depend on several factors including: the size and location of the source of the light that is to be relayed to the viewer (which may be holographic light); the distance between the waveguide and the light source; the intended/required length (in the pupil expansion direction) of the waveguide—and the number of transmission points for pupil expansion—and so on. The block 1200 should also be thicker (in the other direction, orthogonal to the elongate pupil expansion direction—i.e., the "z" direction as defined in FIG. 11A) than the intended/desired thickness of the waveguide.

As a first step in the method, a face 1202 of the block 1200 is polished, to remove surface material and thereby achieve a desired (reduced) thickness, to result in the polished block 1204 shown in FIG. 12A, which will form the "core" waveguide of the structure. The face 1202 that is polished is not one of the elongate faces that will serve as the reflective or transmissive-reflective face of the waveguide (an XY face, using the directionality of FIG. 12A), but instead is one of the other elongate faces (an XZ face, using the directionality of FIG. 12A) that will provide the additional total internal reflection, to accommodate and trap the diverging/diffractive light, as detailed above. For conciseness, we will refer to them as the TIR (total internal reflection) faces 1206, 1208.

As was the case for FIG. 11A, it can be seen in FIG. 12A that, as a result of the polishing process, the corners of the polished face 1206 of the polished block 1204 are not perfectly sharp or right-angled but instead have a rounded or chamfered profile. This is addressed by subsequent steps of the method, as will be understood further from the following description. FIG. 12A shows that only one face 1202 of the original glass block 1200 is polished. It is possible to polish the opposite face as well, however this will often be undesirable since polishing results in imperfect edges and corners of the waveguide, which this method seeks to avoid and reduce.

Once the polished block 1204 is of the correct thickness, a material that has a second, lower refractive index $n_2$ is deposited onto the TIR faces 1206, 1208, in order to coat them. By way of non-limiting example, possible materials for the protective layer(s) include $MgF_2$ and $SiO_2$, deposited by thermal evaporation or chemical vapour deposition. Thereafter, a protective glass is attached (for example, bonded, using an adhesive) to the lower refractive index coatings 1210, 1212. FIG. 12A shows two adhesive layers 1214, 1216 that are respectively added to the lower refractive index coatings 1210, 1212, before respective protective glass layers 1218, 1220 are added thereto, to form a cladded waveguide structure 1222.

The adhesive used may be any suitable adhesive. Advantageously, the adhesive may be partially or totally absorbing to visible light, which reduces unwanted image artifacts if the lower refractive index coatings 1210, 1212 are damaged or otherwise imperfect. Alternatively, the lower refractive index coatings 1210, 1212 may be omitted and instead an optical adhesive with low refractive index and low absorption for visible light may be used for the adhesive layers, and to provide the TIR interface with the core waveguide 1204. Alternatively, metal layers, such as silver or aluminium, may be used instead of the lower refractive index coatings 1210, 1212. This provides conventional reflection rather than total internal reflection.

The protective glass layers 1218, 1220 may be formed from any suitable glass. Advantageously, when the optical coating and/or the adhesive creates the conditions for total internal reflection, the protective layers do not have to do so. They can therefore be formed from the same glass as the core of the pupil expander may be used, which will have an equal coefficient of thermal expansion. This reduces the risk of cracking or debonding during subsequent high temperature processing steps and/or during use in a high temperature environment.

The protective glass layers 1218, 1220 are shown as being rectangular in cross section in FIG. 12A, however in practice they need not be perfectly rectangular (or rectilinear) in cross section. They should be at least of a similar thickness (in the z direction) and width (in the elongate x direction) as the core waveguide 1204—or, as the desired final thickness and width of the core waveguide 1204—to ensure that the layers cover the whole cross-sectional area of the respective TIR faces 1206, 1208 of the core waveguide 1204.

Once the cladded waveguide structure 1222 has been formed, the waveguide faces 1224, 1226 (I.e., the elongate faces of the core waveguide 1204 that will perform a waveguide function, once suitably finished, and the corresponding faces of the respective layers either side—which are the XY faces, using the directionality of FIG. 12A) of the whole structure 1222 are polished. The polishing reduces the size of the cladded waveguide 1222 in the thickness direction (I.e., in the z direction, using the directionality of FIG. 12A). The polishing is on both waveguide faces 1224, 1226 though in some embodiments it may be possible/preferable to polish one side more than the respective other. In any case, the polishing preferably should be carried out at least until the rounded/chamfered corners of the core waveguide (I.e., of the polished block) 1204 have been worn away, to leave straight edges and sharp, substantially right-angled corners on the core waveguide 1204. As can be seen from FIG. 12A, the layers 1218, 1220 either side of the core waveguide 1204 bear the brunt of the polishing, and have rounded/chamfered corners as a result—at the top and bottom of the structure 1222, respectively—however the core waveguide 1204 becomes sharply defined, at least in the YZ plane shown in FIG. 12A.

Figure 12B:
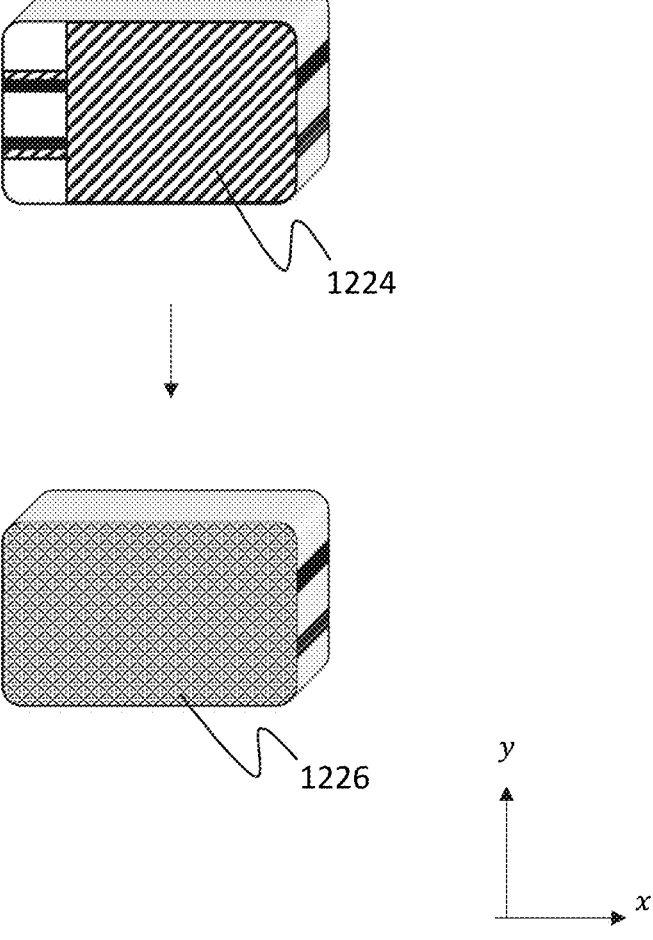
FIG. 12B shows the exit and entrance surfaces of the improved one-dimensional pupil expander formed by the steps of FIG. 12A.

FIG. 12B shows a three-dimensional view of the cladded waveguide 1222 of FIG. 12A, with the directionality axes rotated. At the top, it shows the input (or, entrance) waveguide face 1224 (via which light will enter the structure) and at the bottom it shows the output (or, exit) waveguide face 1226 (from which a plurality of replicas will be transmitted, in practice). The exit face of the core waveguide 1204 and the corresponding faces of the layers either side thereof (I.e., the whole exit face 1224 of the cladded waveguide structure 1222) are coated with a graded coating, to ensure that the light intensity of the replicas emitted from the exit face 1226 is approximately uniform over the length of the waveguide.

Conversely, a high reflectivity coating is applied over the majority of the entrance face 1226 of the cladded waveguide 1222 (including the core waveguide and both layers either side), to reflect light within the waveguide towards the exit face 1224. It can be seen that one region of the entrance face 1224 is not coated. This is the input port, via which light will enter the structure 1222, in practice.

Thus, the method of FIGS. 12A and 12B provide a one-dimensional waveguide (or, pupil expander) with a lower refractive index coating on the top and bottom surfaces, and protective glass layers attached to the lower refractive index coating by adhesive layers (which might also serve as the lower refractive index coating, in some embodiments).

Optionally, for any of the methods described in relation to FIGS. 11A to 12B, the YZ ends of the cladded waveguide structure can also be polished—that is, it can be polished a third time, on one or both sides, in the "width" direction, which is the "x" direction in the Figures. If the waveguide structure is not polished in the width direction, rounded corners may remain on the core waveguide, at either end (I.e., on the YZ faces, as per the directionality defined in the Figures herein). However, this is permissible as those end faces are not involved in waveguiding or total internal reflection, and therefore any roundness of them will not lead to image defects.

Regardless of whether the method shown and described in relation to FIGS. 11A and 11B, or the method shown and described in relation to FIGS. 12A and 12B is followed, the recognitions made by the present inventor, as disclosed herein, provide a waveguide—i.e., a pupil expander—with high quality edges along the expansion direction (I.e., along the elongate waveguide direction). This enables total internal reflection to be used at the non-waveguiding elongate surfaces of the pupil expander, without image quality loss that is experienced in conventional arrangements due to defects at the edges/corners of conventional pupil expanders. As will be appreciated from the foregoing description, a waveguide, or pupil expander, as described herein (which, for brevity, we will refer to as a "TIR pupil expander") can be significantly thinner than a non-TIR pupil expander despite the addition of protective layers. Therefore, the methods described herein enable reduction of the size, and therefore the weight, of the final component and any device in which the component is used (e.g., a HUD).

A TIR pupil expander will also produce a smaller ray bundle emitted than is produced by a non-TIR pupil expander, for an equivalent field of view. In other words, the ray bundle from a TIR pupil expander will have a smaller cross-sectional area than the ray bundle emitted from a non-TIR pupil expander. This is advantageous as a smaller ray bundle can be coupled into another optical component, such as a second pupil expander, such as the "slab" type pupil expander shown in FIG. 5B herein, with much higher efficiency than is possible for larger ray bundles. Therefore, a given luminance can be obtained with a lower input power, for the TIR pupil expander described herein, and a higher maximum luminance is also possible.

A TIR pupil expander as described herein can be employed for pupil expansion of a diffractive or diverging light field—such as, but not limited to, a holographic light field output by a pixelated display device such as a spatial light modulator (SLM)—without the significant loss of light that can be experienced in conventional waveguides for an equivalent field of view, and without the need for a large or bulky, expensive pupil expander.

Whilst "total" internal reflection (TIR) has been described, it is possible in some embodiments that less than total (I.e., imperfect) reflection may be provided by the non-waveguiding surfaces of the pupil expander. Such imperfect reflection can also be highly useful in retaining a large amount of light within the pupil expander, thus reducing losses as compared to conventional arrangements.

The cladded waveguide structure (I.e., the TIR pupil expander) described herein may be used in any suitable optical set up. It may be used in conjunction with any other optical components, including but not limited to display devices, lenses, mirrors, and so on. Two or more cladded waveguides may be used together in an optical arrangement, for example to provide two-dimensional optical expansion. For example, the cladded waveguide structure (I.e., the TIR pupil expander) described herein may form part of a projector, which may be a holographic projector. For example, it may form part of a head-up display, such as in a vehicle, aircraft, locomotive or other transport means. However, these examples are illustrative only and should not be regarded as limiting.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of manufacturing a waveguide, the waveguide comprising:

a waveguiding layer of a transparent medium having a first refractive index $(n_1)$, the waveguiding layer having a first pair of opposing elongate surfaces arranged to guide a wavefront through the transparent medium from the input port to the output port by reflection therebetween in a zig-zag path to provide a plurality of reflections at distinct locations along lengths of the first surface of the first pair of opposing elongate surfaces and the second surface of the first pair of opposing elongate surfaces, and a second pair of opposing surfaces, an input port on a first surface or a second surface of the first pair of opposing elongate surfaces, an output port on the first surface of the first pair of opposing elongate surfaces, a partially transmissive-reflective coating on the first surface of the first pair of opposing elongate surfaces, arranged such that the wavefront is divided at each reflection and a plurality of replicas of the wavefront are transmitted through a region of the first surface that forms the output port, and a reflective coating on the second surface of the first pair of opposing elongate surfaces, the method comprising:

providing a body of the transparent medium having a first pair of opposing elongate surfaces and a second pair of opposing surfaces;

polishing a first surface of the second pair of opposing surfaces of the body of the transparent medium to provide the second pair of surfaces of the waveguiding layer, the second pair of surfaces of the waveguiding layer having a separation therebetween;

bonding a first protective layer to the polished first surface of the second pair of opposing surfaces;

polishing a first surface of the first pair of opposing elongate surfaces and/or a second surface of the first pair of opposing elongate surfaces of the body of transparent medium to provide the first pair of surfaces of the waveguiding layer, the first pair of surfaces having a separation therebetween;

providing the reflective coating on the first surface of the first pair of opposing elongate surfaces, and providing the partially-transmissive/partially-reflective coating on the second surface of the first pair of opposing elongate surfaces.

2. A method as claimed in claim 1 wherein the first protective layer is a first cladding having a refractive index $(n_2)$ that is less than the first refractive index $(n_1)$ of the transparent medium.

3. A method as claimed in claim 2 wherein the step of bonding the first protective layer to the transparent medium comprises fusion bonding or heating.

4. A method as claimed in claim 1 wherein the step of bonding the first protective layer to the transparent medium is preceded by a step of applying an optical coating to the at least one surface of the second pair of opposing surfaces, wherein the optical coating has a refractive index $(n_2)$ less than the first refractive index $(n_1)$ of the transparent medium.

5. A method as claimed in claim 4 wherein the step of applying the optical coating is followed by a step of adding an adhesive layer, before bonding the protective layer to the transparent medium.

6. A method as claimed in claim 5 wherein the adhesive layer is partially or totally absorbing to visible light for waveguiding.

7. A method as claimed in claim 4 wherein the protective layer is formed from the same material same as the transparent medium.

8. A method as claimed in claim 1 wherein the first protective layer has a thickness sufficient to prevent evanescent loss in the waveguide.

9. A method as claimed in claim 1, wherein the second pair of opposing surfaces is arranged to guide the wavefront through the transparent medium from the input port to the output port by total internal reflection; and wherein each surface of the second pair of opposing surfaces is clad with a respective second protective layer of material having a refractive index less than that of the transparent medium.

10. A method as claimed in claim 9 wherein each second protective layer is a cladding having a second refractive index (n$_2$) that is less than a first refractive index (n$_1$) of the transparent medium.

11. A method as claimed in claim 10 wherein each second protective layer is fusion-bonded to, or co-moulded with, the transparent medium.

12. A method as claimed in claim 10 wherein an optical coating is provided between at least one surface of the second pair of opposing surfaces and the respective second portective layer, wherein the optical coating has a refractive index (n$_2$) that is less than the first refractive index (n$_1$) of the transparent medium.

13. A method as claimed in claim 12 wherein an adhesive layer is provided between the optical coating and the respective second protective layer.

14. A method as claimed in claim 13 wherein the adhesive layer provided between the optical coating and the respective second protective layer is partially or totally absorbing to visible light for waveguiding.

15. A method as claimed in claim 12 wherein the protective layer is formed from the same material same as the transparent medium.

16. A method as claimed in claim 9 wherein each layer of cladding material has a thickness sufficient to prevent evanescent loss in the waveguide.

17. The method of claim 1, wherein the input port is at a position on the first surface of the first pair of opposed surfaces that lacks the partially transmissive-reflective coating.

18. The method of claim 1, wherein the input port is at a position on the second surface of the first pair of opposed surfaces that lacks the reflective coating.

19. A method of manufacturing a waveguide comprising
a waveguiding layer of a transparent medium having a first refractive index (n$_1$), the waveguiding layer having
a first pair of opposing elongate surfaces arranged to guide a wavefront through the transparent medium from the input port to the output port by reflection therebetween in a zig-zag path to provide a plurality of reflections at distinct locations along lengths of the first surface of the first pair of opposing elongate surfaces and the second surface of the first pair of opposing elongate surfaces, and
a second pair of opposing surfaces, an input port on a first surface or a second surface of the first pair of opposing elongate surfaces, an output port on the first surface of the first pair of opposing elongate surfaces, a partially transmissive-reflective coating on the first surface of the first pair of opposing elongate surfaces, arranged such that the wavefront is divided at each reflection and a plurality of replicas of the wavefront are transmitted through a region of the first surface that forms the output port, and a reflective coating on the second surface of the first pair of opposing elongate surfaces, the method comprising:

providing a body of the transparent medium having a first pair of opposing elongate surfaces and a second pair of opposing surfaces;

polishing a first surface of the second pair of opposing surfaces of the body of the transparent medium to provide the second pair of surfaces of the waveguiding layer, the second pair of surfaces of the waveguiding layer having a separation therebetween and introduce an undesired profile in at least one edge of the first surface of the second pair of opposing surfaces;

applying a first optical coating to the polished first surface of the second pair of opposing surfaces, the optical coating having a refractive index (n$_2$) less than the first refractive index (n$_1$) of the transparent medium;

bonding a first protective layer to the first optical coating, wherein the first protective layer is formed from the same material as the transparent medium; and polishing a first surface of the first pair of opposing elongate surfaces and/or a second surface of the first pair of opposing elongate surfaces of the body of transparent medium to provide the first pair of surfaces of the waveguiding layer, the first pair of surfaces having separation therebetween and remove the undesired profile.

20. The method of claim 19, wherein the undesirable profile in the at least one edge of the first surface of the second pair of opposing surfaces is a rounding or chamfering.

*     *     *     *     *